US012790512B2

(12) United States Patent
Jeong

(10) Patent No.: US 12,790,512 B2
(45) Date of Patent: Nov. 10, 2026

(54) CROSSLINKING TYPE PDMS COMPOSITION MIXING PROCESS TECHNOLOGY FOR IMPROVING WATER-REPELLENT AND OIL-REPELLENT PROPERTIES

(71) Applicant: Chanyoung Jeong, Busan (KR)

(72) Inventor: Chanyoung Jeong, Busan (KR)

( * ) Notice: Subject to any disclaimer, the term of this patent is extended or adjusted under 35 U.S.C. 154(b) by 678 days.

(21) Appl. No.: 18/274,270

(22) PCT Filed: Jan. 27, 2022

(86) PCT No.: PCT/KR2022/001425
§ 371 (c)(1),
(2) Date: Jul. 26, 2023

(87) PCT Pub. No.: WO2022/164210
PCT Pub. Date: Aug. 4, 2022

(65) Prior Publication Data

US 2024/0124742 A1 Apr. 18, 2024

(30) Foreign Application Priority Data

Jan. 28, 2021 (KR) ........................ 10-2021-0012170
Jun. 30, 2021 (KR) ........................ 10-2021-0085454

(51) Int. Cl.
*C08F 2/46* (2006.01)
*C08F 2/50* (2006.01)
*C08G 61/04* (2006.01)
*C09D 5/00* (2006.01)
*C09D 7/20* (2018.01)
*C09D 183/04* (2006.01)

(52) U.S. Cl.
CPC ............ *C09D 183/04* (2013.01); *C09D 5/00* (2013.01); *C09D 7/20* (2018.01)

(58) Field of Classification Search
CPC ............. C09D 5/00; C09D 5/16; C09D 7/20; C09D 183/04; C08G 77/04
USPC ........... 522/77, 74, 71, 1, 189, 184, 6; 520/1
See application file for complete search history.

(56) References Cited

U.S. PATENT DOCUMENTS

2022/0411589 A1* 12/2022 Iwata ...................... C08K 9/08

FOREIGN PATENT DOCUMENTS

| | | | |
|---|---|---|---|
| JP | 2013-514841 | A5 | 1/2014 |
| JP | 2016-083812 | A | 5/2016 |
| JP | 2018-009088 | A | 1/2018 |
| KR | 10-2001-0046317 | A | 6/2001 |
| KR | 10-1039839 | B1 | 6/2011 |
| KR | 10-1569460 | B1 | 11/2015 |
| KR | 10-2020-0027397 | A | 3/2020 |
| KR | 10-2020-0139614 | A | 12/2020 |

OTHER PUBLICATIONS

International Search Report for PCT/KR2022/001425 dated May 17, 2022 (PCT/ISA/210).

* cited by examiner

*Primary Examiner* — Jessica Whiteley
(74) *Attorney, Agent, or Firm* — Sughrue Mion, PLLC

(57) ABSTRACT

The present invention relates to a coating composition for imparting oil-repellent and water-repellent to the surface of a metal substrate, comprising a crosslinked PDMS derivative and hexane. The coating composition according to the present invention can impart water-repellent and oil-repellent by using a crosslinked PDMS derivative represented by chemical formula 1 and an organic solvent in a specific mixing ratio, is prepared at low cost, and is also applicable to coating of a microstructured oxide film since a coating film can be adjusted to have a thickness of several to tens of nanometers, and thus can be useful for oil vapor recovery apparatuses/facilities, pipes, hoods, parts of hoods, nozzles, pipe conduit and the like which require water-repellent and oil-repellent.

13 Claims, 17 Drawing Sheets

[Fig. 1]

Example 1 Measurement of water contact angle

| Time | 0 s | 30 s | 60 s |
|---|---|---|---|
| Contact angle (°) | 107.59 ± 1.31 | 106.19 ± 1.21 | 104.83 ± 1.11 |

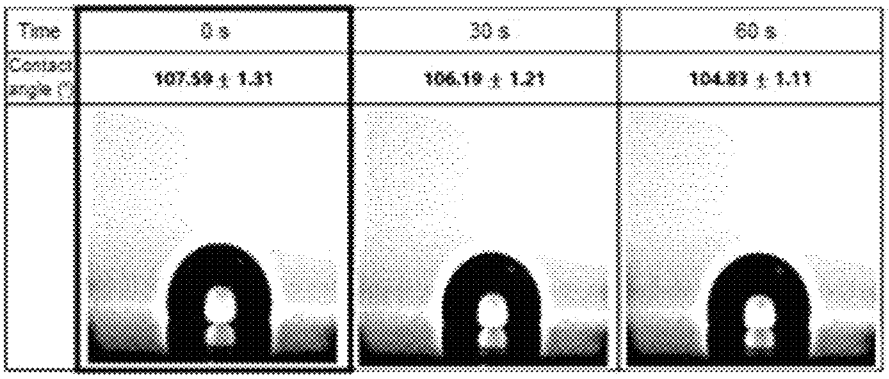

Example 1 Measurement of water contact angle hysteresis

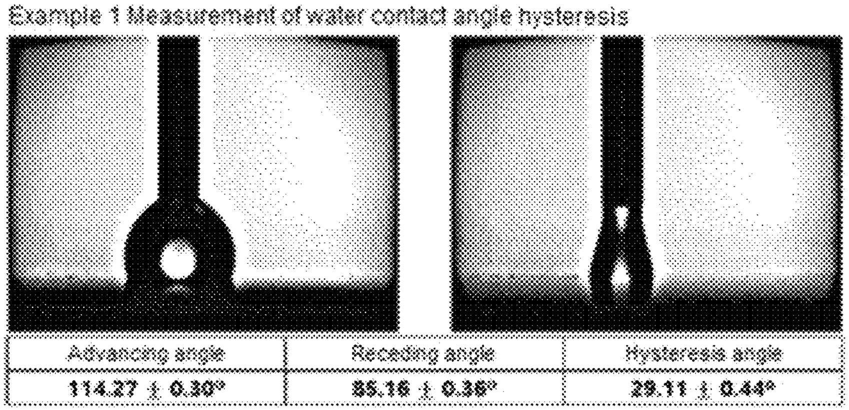

| Advancing angle | Receding angle | Hysteresis angle |
|---|---|---|
| 114.27 ± 0.30° | 85.16 ± 0.36° | 29.11 ± 0.44° |

Example 1 Measurement of oil contact angle

| Time | 0 s | 30 s | 60 s |
|---|---|---|---|
| Contact angle (°) | 63.95 ± 0.12 | 61.60 ± 0.10 | 60.56 ± 0.43 |

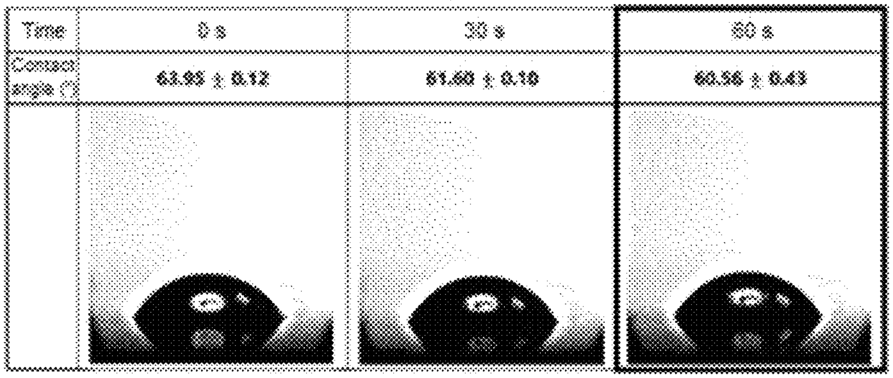

Example 1 Measurement of oil contact angle hysteresis

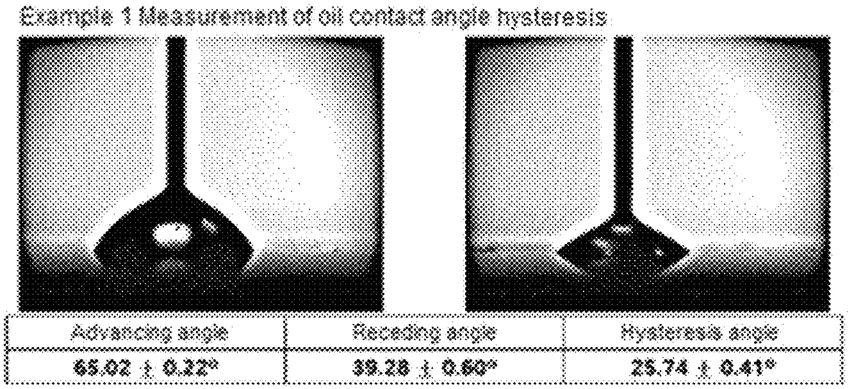

| Advancing angle | Receding angle | Hysteresis angle |
|---|---|---|
| 65.02 ± 0.22° | 39.28 ± 0.60° | 25.74 ± 0.41° |

[Fig. 2]

Example 2 Measurement of water contact angle

| Time | 0 s | 30 s | 60 s |
|---|---|---|---|
| Contact angle (°) | 104.57 ± 0.35 | 103.47 ± 0.38 | 101.91 ± 0.49 |
| | 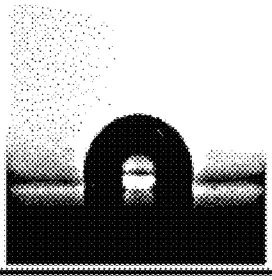 | 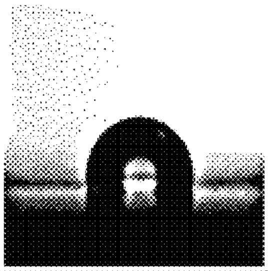 | 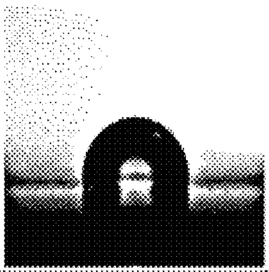 |

Example 2 Measurement of water contact angle hysteresis

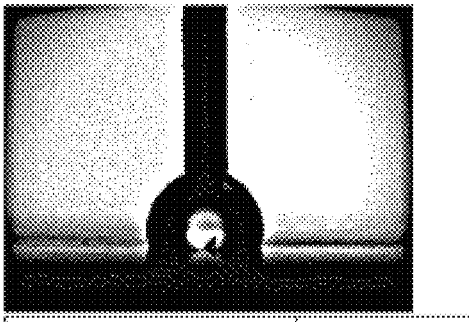

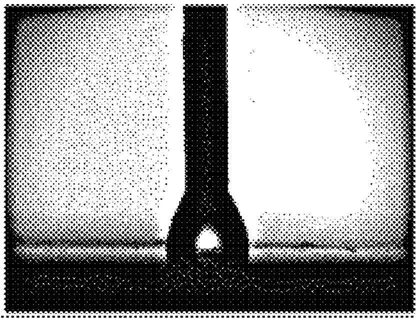

| Advancing angle | Receding angle | Hysteresis angle |
|---|---|---|
| 111.90 ± 1.16° | 86.25 ± 0.62° | 25.65 ± 0.58° |

Example 2 Measurement of oil contact angle

| Time | 0 s | 30 s | 60 s |
|---|---|---|---|
| Contact angle (°) | 65.12 ± 0.44 | 62.47 ± 0.89 | 61.05 ± 0.67 |
| | 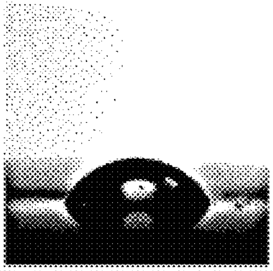 | 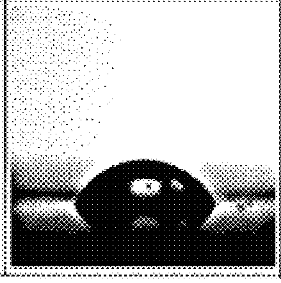 | 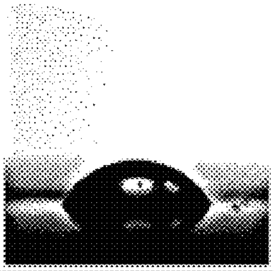 |

Example 2 Measurement of oil contact angle hysteresis

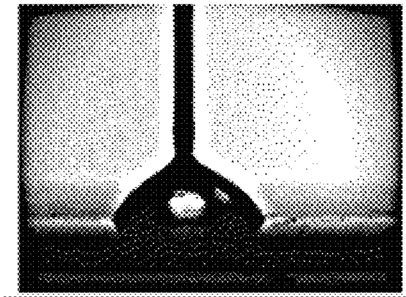

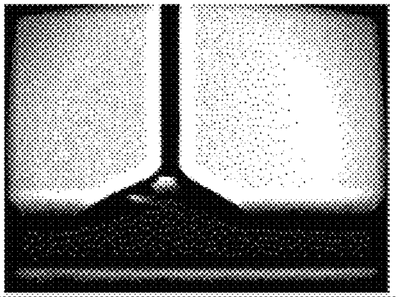

| Advancing angle | Receding angle | Hysteresis angle |
|---|---|---|
| 65.55 ± 0.16° | 38.58 ± 0.71° | 26.97 ± 0.64° |

[Fig. 3]

Example 3 Measurement of water contact angle

| Time | 0 s | 30 s | 60 s |
|---|---|---|---|
| Contact angle (°) | 99.57 ± 0.22 | 98.01 ± 0.23 | 96.70 ± 0.42 |
| | 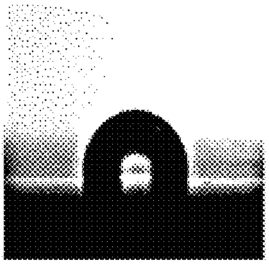 | 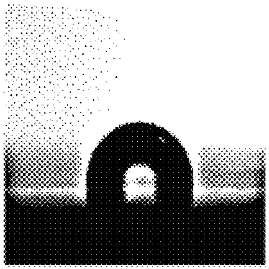 | 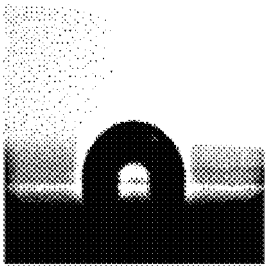 |

Example 3 Measurement of water contact angle hysteresis

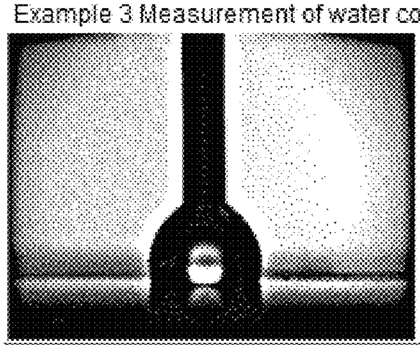

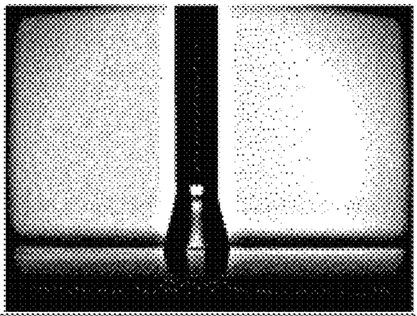

| Advancing angle | Receding angle | Hysteresis angle |
|---|---|---|
| 107.96 ± 0.58° | 80.53 ± 1.19° | 27.43 ± 0.75° |

Example 3 Measurement of oil contact angle

| Time | 0 s | 30 s | 60 s |
|---|---|---|---|
| Contact angle (°) | 60.36 ± 0.59 | 57.78 ± 0.95 | 57.05 ± 1.05 |
| | 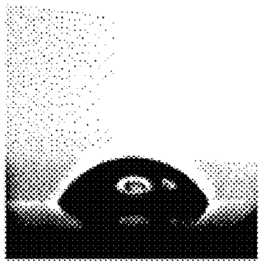 | 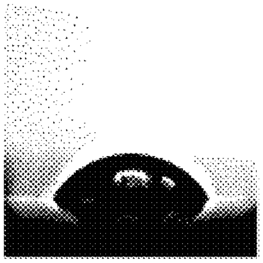 | 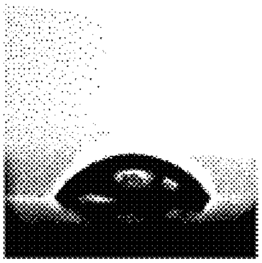 |

Example 3 Measurement of oil contact angle hysteresis

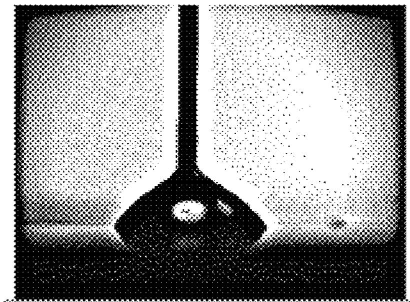

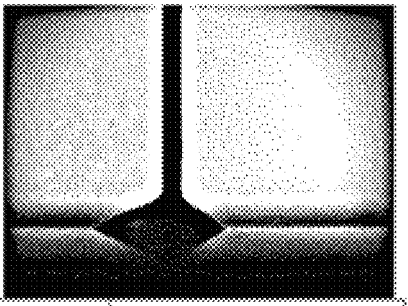

| Advancing angle | Receding angle | Hysteresis angle |
|---|---|---|
| 59.95 ± 0.04° | 32.40 ± 0.41° | 27.55 ± 0.37° |

[Fig. 4]

Example 4 Measurement of water contact angle

| Time | 0 s | 30 s | 60 s |
|---|---|---|---|
| Contact angle (°) | 100.28 ± 1.24 | 98.65 ± 1.12 | 97.02 ± 1.04 |
| | 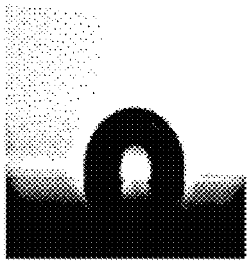 | 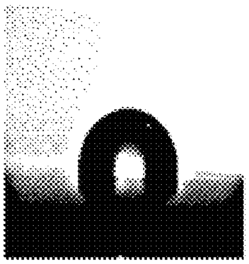 | 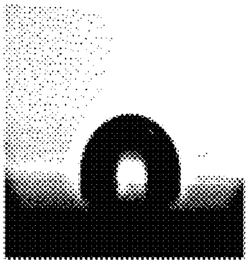 |

Example 4 Measurement of water contact angle hysteresis

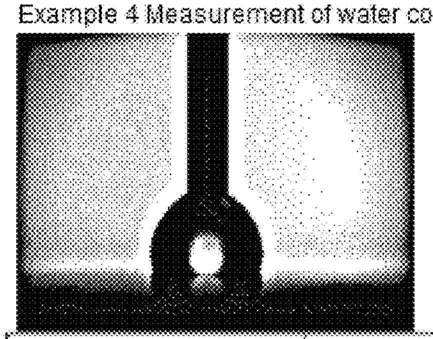

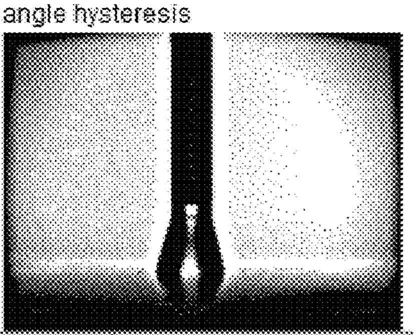

| Advancing angle | Receding angle | Hysteresis angle |
|---|---|---|
| 111.86 ± 1.02° | 83.95 ± 1.27° | 27.91 ± 0.94° |

Example 4 Measurement of oil contact angle

| Time | 0 s | 30 s | 60 s |
|---|---|---|---|
| Contact angle (°) | 60.87 ± 3.28 | 58.12 ± 1.99 | 54.87 ± 1.44 |
| | 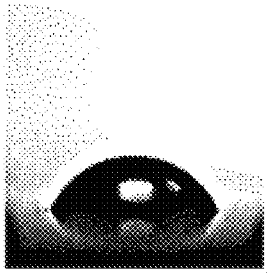 | 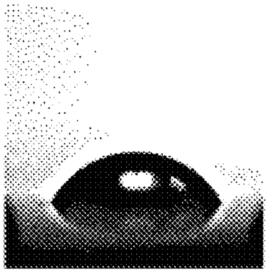 | 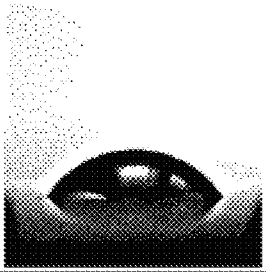 |

Example 4 Measurement of oil contact angle hysteresis

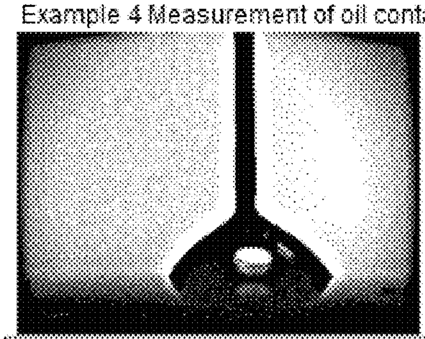

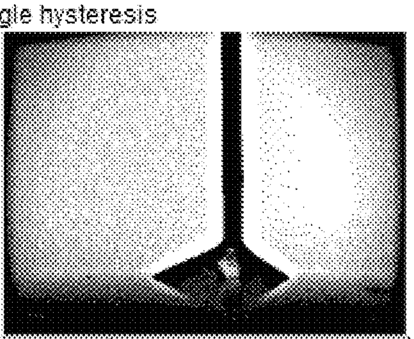

| Advancing angle | Receding angle | Hysteresis angle |
|---|---|---|
| 63.05 ± 0.19° | 35.25 ± 0.15° | 27.79 ± 0.09° |

[Fig. 5]

Example 5 Measurement of water contact angle

| Time | 0 s | 30 s | 60 s |
|---|---|---|---|
| Contact angle (°) | 102.66 ± 0.80 | 100.35 ± 1.15 | 99.12 ± 0.68 |
| | 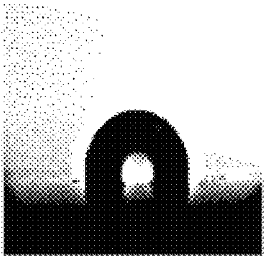 | 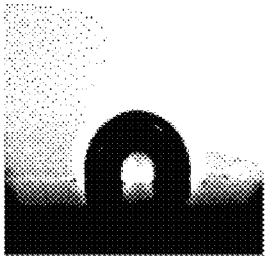 | 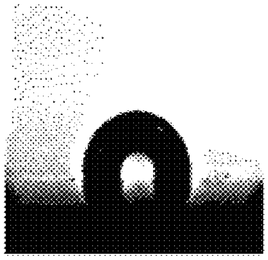 |

Example 5 Measurement of water contact angle hysteresis

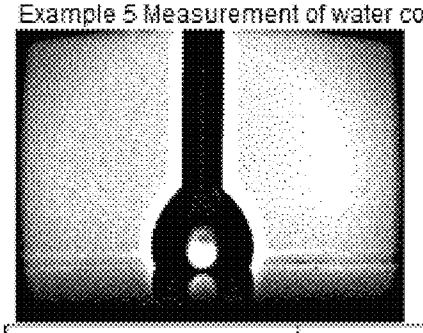

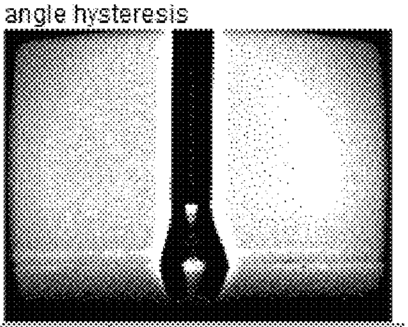

| Advancing angle | Receding angle | Hysteresis angle |
|---|---|---|
| 107.56° ± 0.91 | 85.36° ± 0.80 | 22.20° ± 0.58 |

Example 5 Measurement of oil contact angle

| Time | 0 s | 30 s | 60 s |
|---|---|---|---|
| Contact angle (°) | 62.6 ± 0.64 | 61.06 ± 1.52 | 60.79 ± 1.38 |
| | 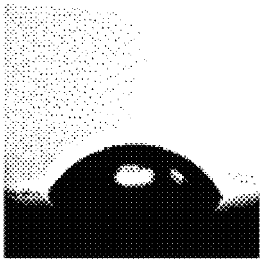 | 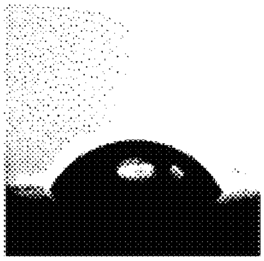 | 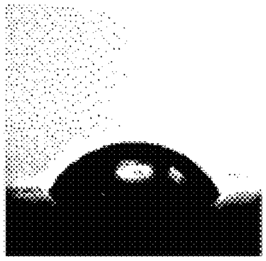 |

Example 5 Measurement of oil contact angle hysteresis

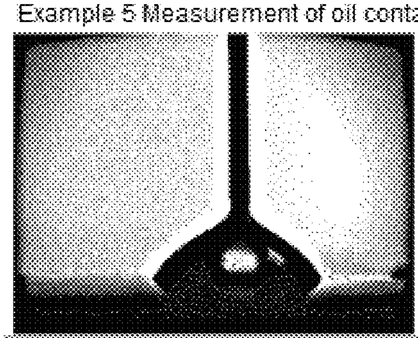

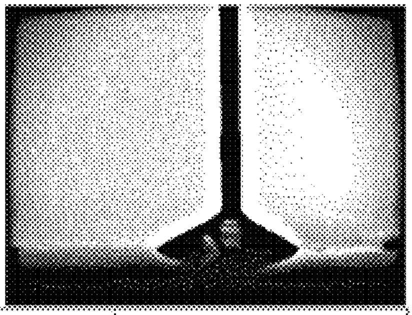

| Advancing angle | Receding angle | Hysteresis angle |
|---|---|---|
| 60.22 ± 0.13° | 38.10 ± 0.39° | 22.12 ± 0.37° |

[Fig. 6]

Example 6 Measurement of water contact angle

| Time | 0 s | 30 s | 60 s |
|---|---|---|---|
| Contact angle (°) | 100.87 ± 3.00 | 99.27 ± 3.08 | 97.93 ± 3.16 |
| | 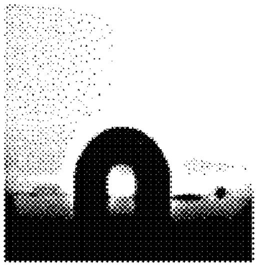 | 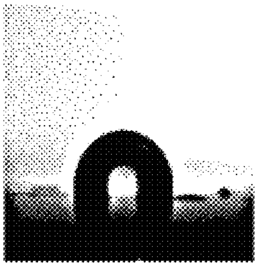 | 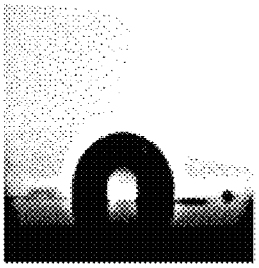 |

Example 6 Measurement of water contact angle hysteresis

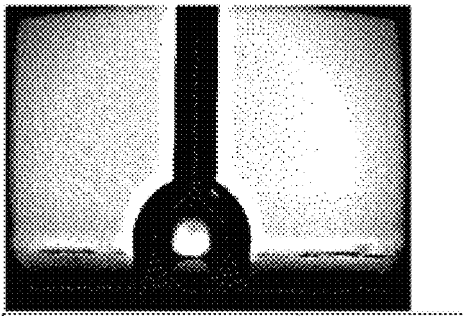

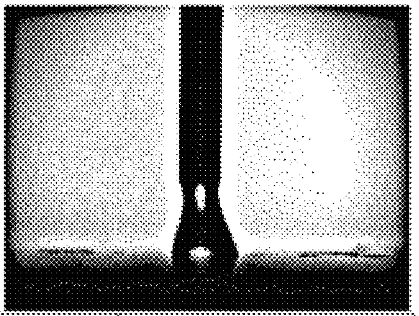

| Advancing angle | Receding angle | Hysteresis angle |
|---|---|---|
| 105.35 ± 0.92° | 77.03 ± 1.55° | 28.32 ± 0.85° |

Example 6 Measurement of oil contact angle

| Time | 0 s | 30 s | 60 s |
|---|---|---|---|
| Contact angle (°) | 61.27 ± 2.60 | 58.63 ± 6.11 | 58.44 ± 6.00 |
| | 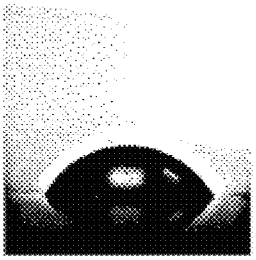 | 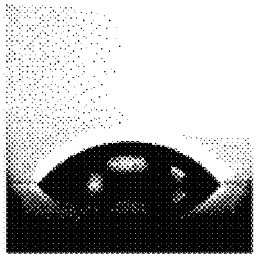 | 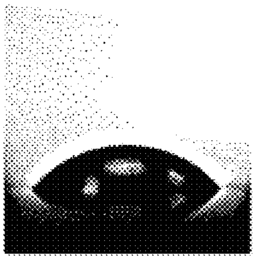 |

Example 6 Measurement of oil contact angle hysteresis

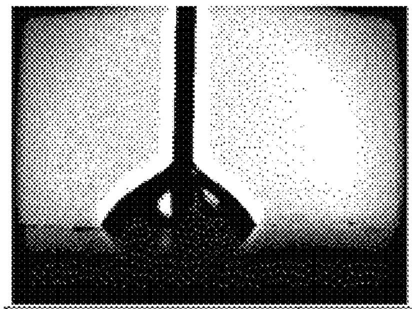

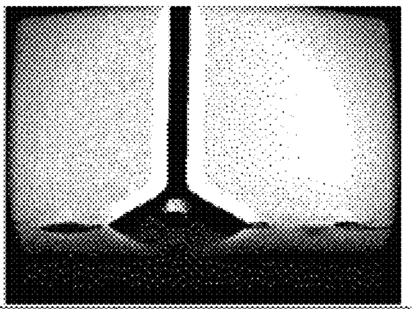

| Advancing angle | Receding angle | Hysteresis angle |
|---|---|---|
| 63.30 ± 0.30° | 34.78 ± 2.60° | 28.52 ± 2.90° |

[Fig. 7]

Example 7 Measurement of water contact angle

| Time | 0 s | 30 s | 60 s |
|---|---|---|---|
| Contact angle (°) | 103.96 ± 2.83 | 102.56 ± 3.14 | 101.20 ± 3.10 |
| | 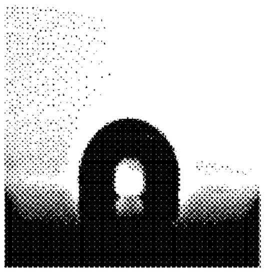 | 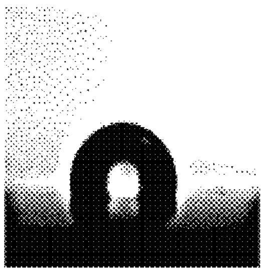 | 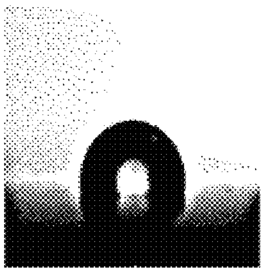 |

Example 7 Measurement of water contact angle hysteresis

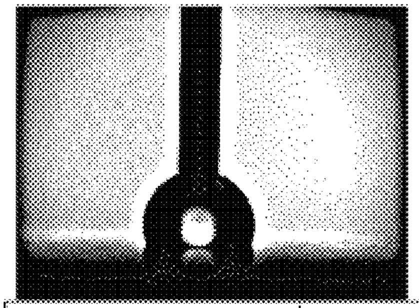

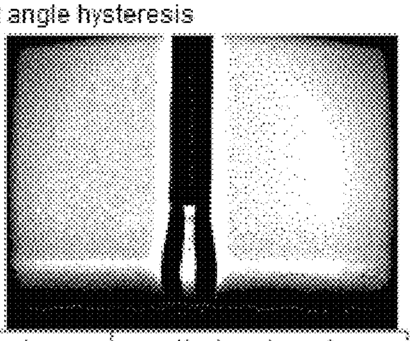

| Advancing angle | Receding angle | Hysteresis angle |
|---|---|---|
| 116.57 ± 0.55° | 92.38 ± 0.35° | 24.19 ± 0.24° |

Example 7 Measurement of oil contact angle

| Time | 0 s | 30 s | 60 s |
|---|---|---|---|
| Contact angle (°) | 60.18 ± 1.48 | 59.86 ± 1.52 | 59.62 ± 1.43 |
| | 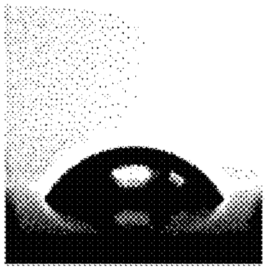 | 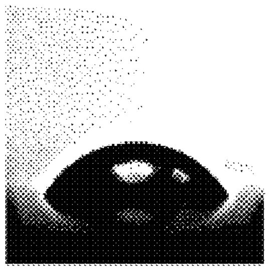 | 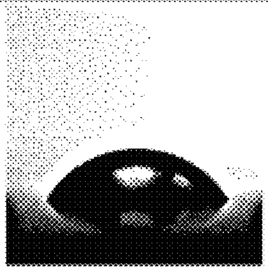 |

Example 7 Measurement of oil contact angle hysteresis

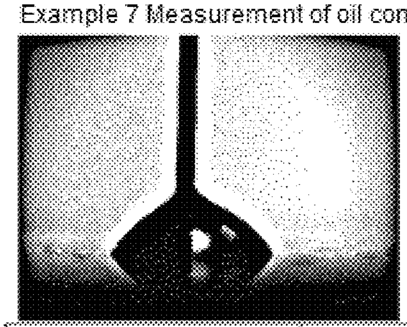

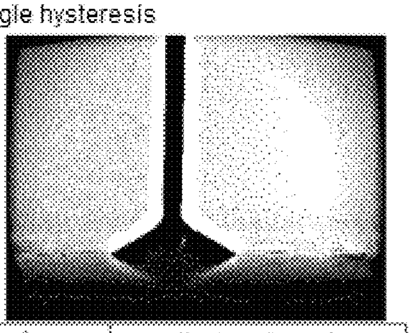

| Advancing angle | Receding angle | Hysteresis angle |
|---|---|---|
| 59.40 ± 0.66° | 34.54 ± 1.61° | 24.86 ± 1.40° |

[Fig. 8]

Example 8 Measurement of water contact angle

| Time | 0 s | 30 s | 60 s |
|---|---|---|---|
| Contact angle (°) | 114.13 ± 2.53° | 112.93 ± 2.54° | 111.74 ± 2.51° |

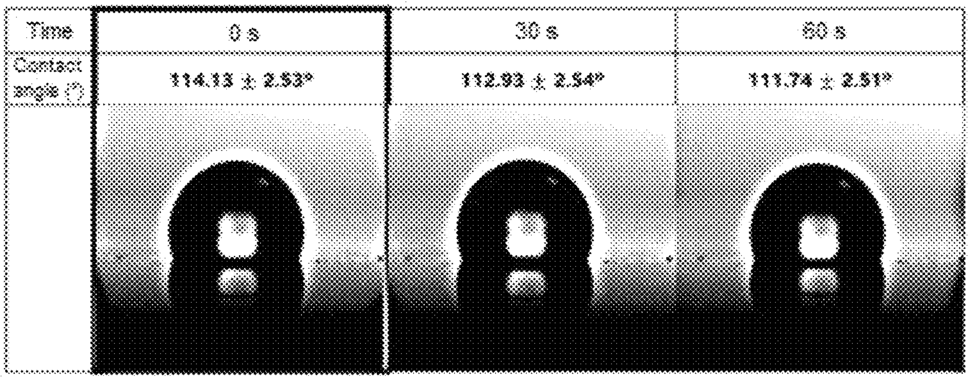

Example 8 Measurement of water contact angle hysteresis

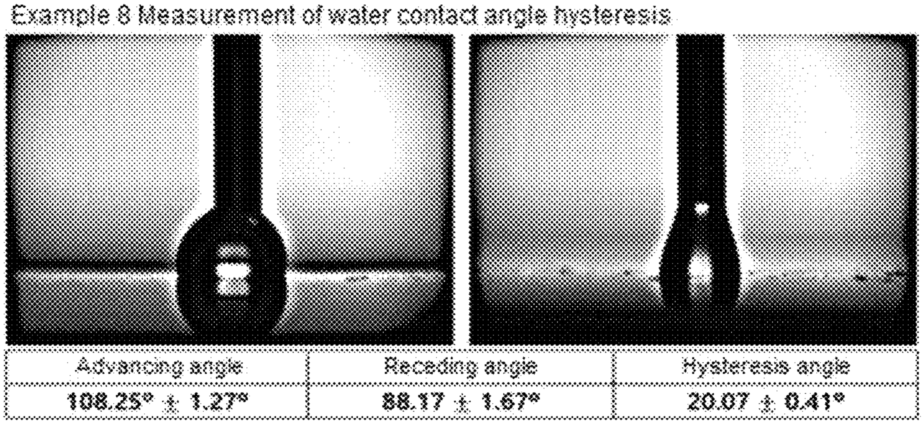

| Advancing angle | Receding angle | Hysteresis angle |
|---|---|---|
| 108.25° ± 1.27° | 88.17 ± 1.67° | 20.07 ± 0.41° |

Example 8 Measurement of oil contact angle

| Time | 0 s | 30 s | 60 s |
|---|---|---|---|
| Contact angle (°) | 67.67 ± 3.10° | 61.07 ± 3.10° | 58.84 ± 3.10° |

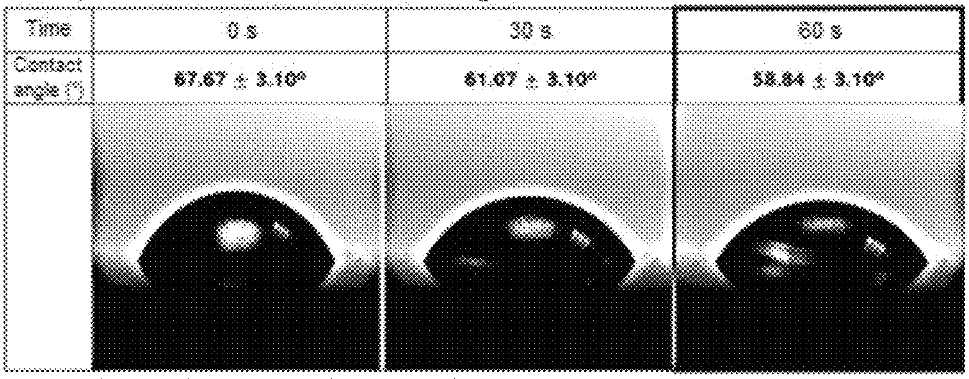

Example 8 Measurement of oil contact angle hysteresis

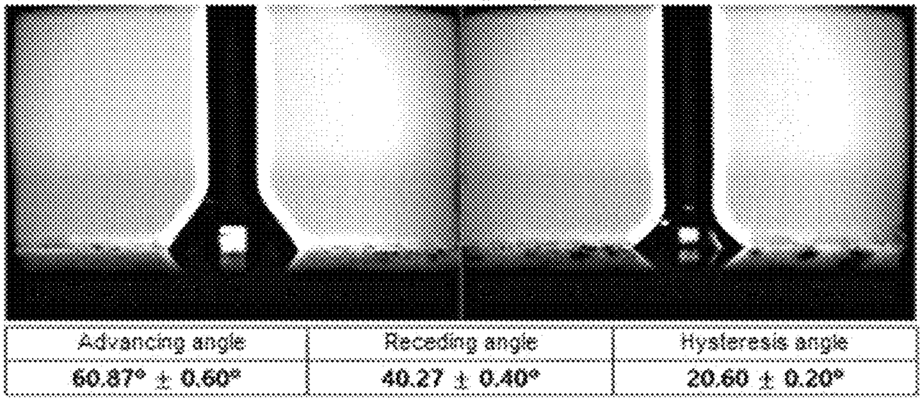

| Advancing angle | Receding angle | Hysteresis angle |
|---|---|---|
| 60.87° ± 0.60° | 40.27 ± 0.40° | 20.60 ± 0.20° |

[Fig. 9]

Example 9 Measurement of water contact angle

| Time | 0 s | 30 s | 60 s |
|---|---|---|---|
| Contact angle (°) | 113.22 ± 1.47° | 112.14 ± 1.64° | 111.01 ± 1.64° |

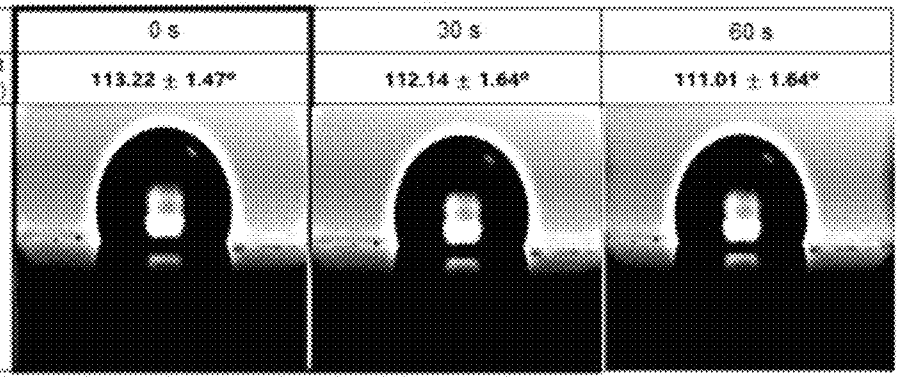

Example 9 Measurement of water contact angle hysteresis

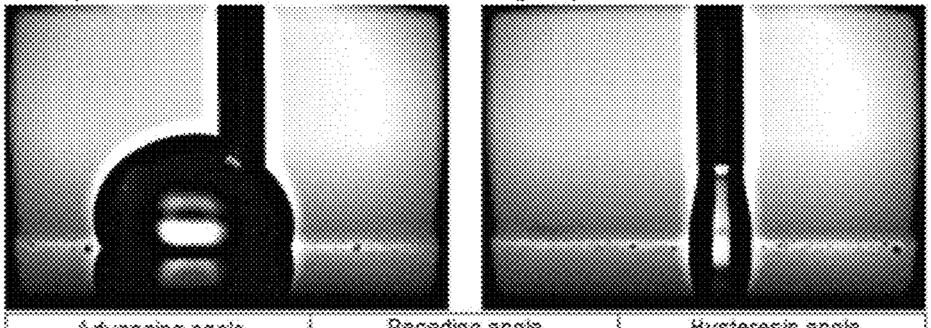

| Advancing angle | Receding angle | Hysteresis angle |
|---|---|---|
| 113.82° ± 0.49° | 93.88 ± 2.68° | 19.94 ± 2.20° |

Example 9 Measurement of oil contact angle

| Time | 0 s | 30 s | 60 s |
|---|---|---|---|
| Contact angle (°) | 58.95 ± 9.33° | 55.83 ± 9.93° | 54.55 ± 8.12° |

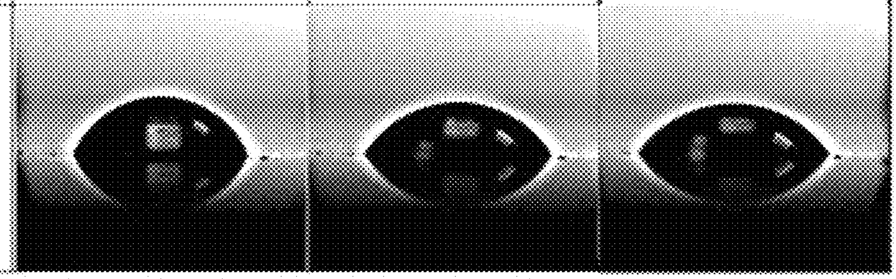

Example 9 Measurement of oil contact angle hysteresis

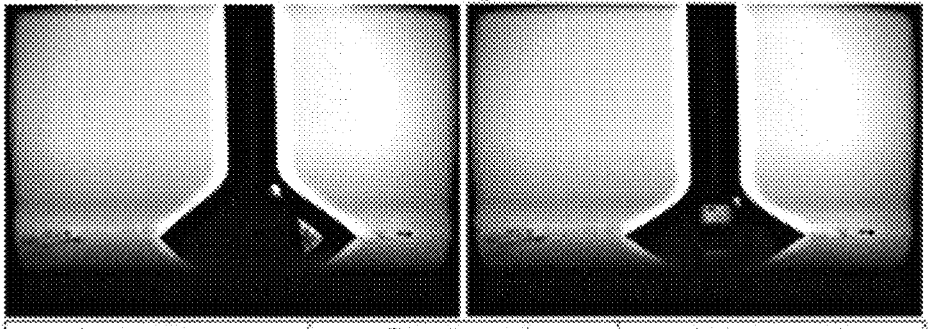

| Advancing angle | Receding angle | Hysteresis angle |
|---|---|---|
| 44.97° ± 0.45° | 34.31 ± 0.62° | 13.75 ± 1.02° |

[Fig. 10]
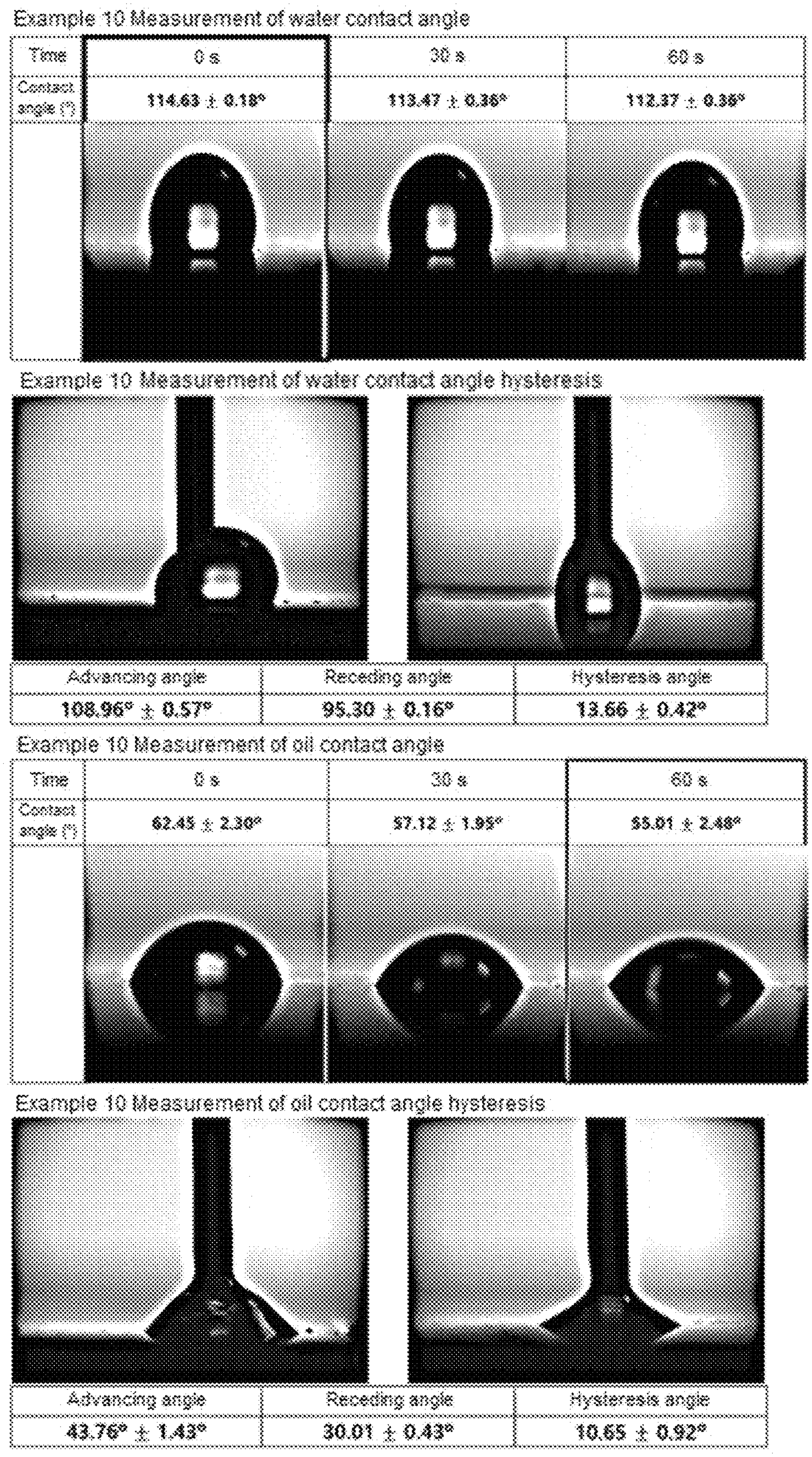

[Fig. 11]

Comparative Example 1 Measurement of water contact angle

| Time | 0 s | 30 s | 60 s |
|---|---|---|---|
| Contact angle (°) | 77.72 ± 4.64 | 75.06 ± 4.35 | 72.51 ± 3.91 |

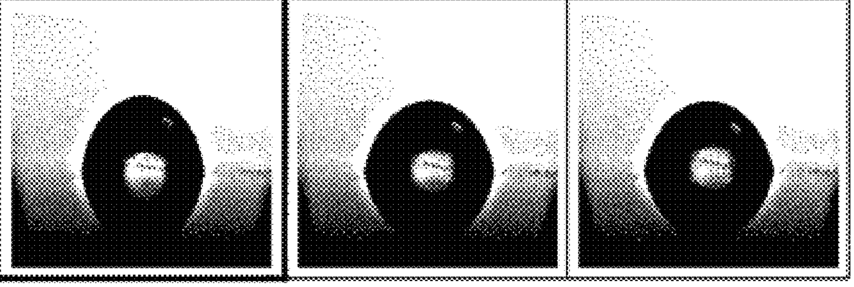

Comparative Example 1 Measurement of water contact angle hysteresis

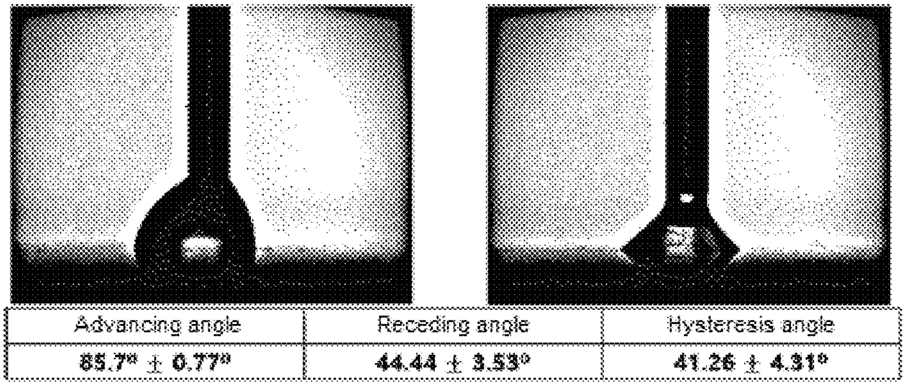

| Advancing angle | Receding angle | Hysteresis angle |
|---|---|---|
| 85.7° ± 0.77° | 44.44 ± 3.53° | 41.26 ± 4.31° |

Comparative Example 1 Measurement of oil contact angle

| Time | 0 s | 30 s | 60 s |
|---|---|---|---|
| Contact angle (°) | 33.81 ± 6.09 | 32.40 ± 6.09 | 31.67 ± 6.02 |

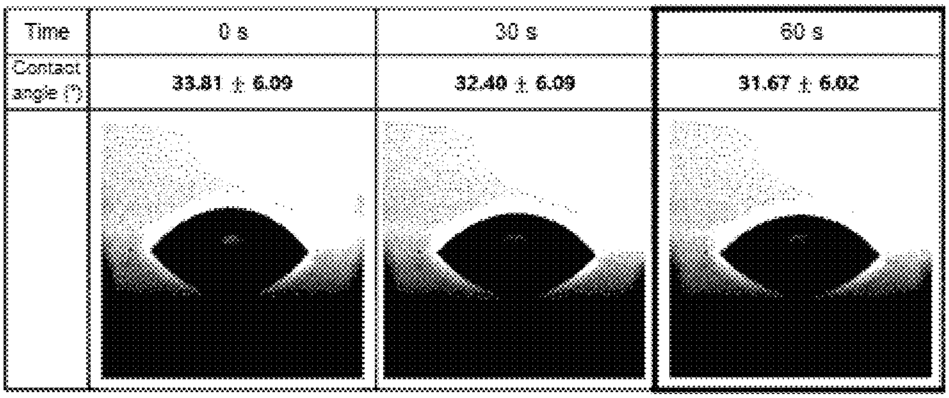

Comparative Example 1 Measurement of oil contact angle hysteresis

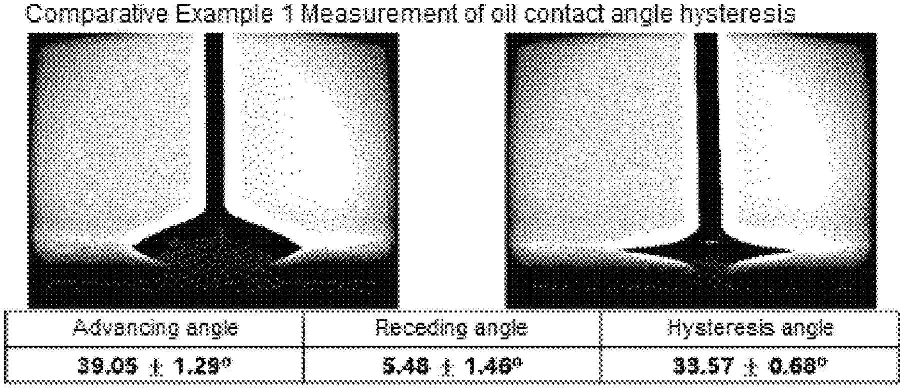

| Advancing angle | Receding angle | Hysteresis angle |
|---|---|---|
| 39.05 ± 1.29° | 5.48 ± 1.46° | 33.57 ± 0.68° |

[Fig. 12]
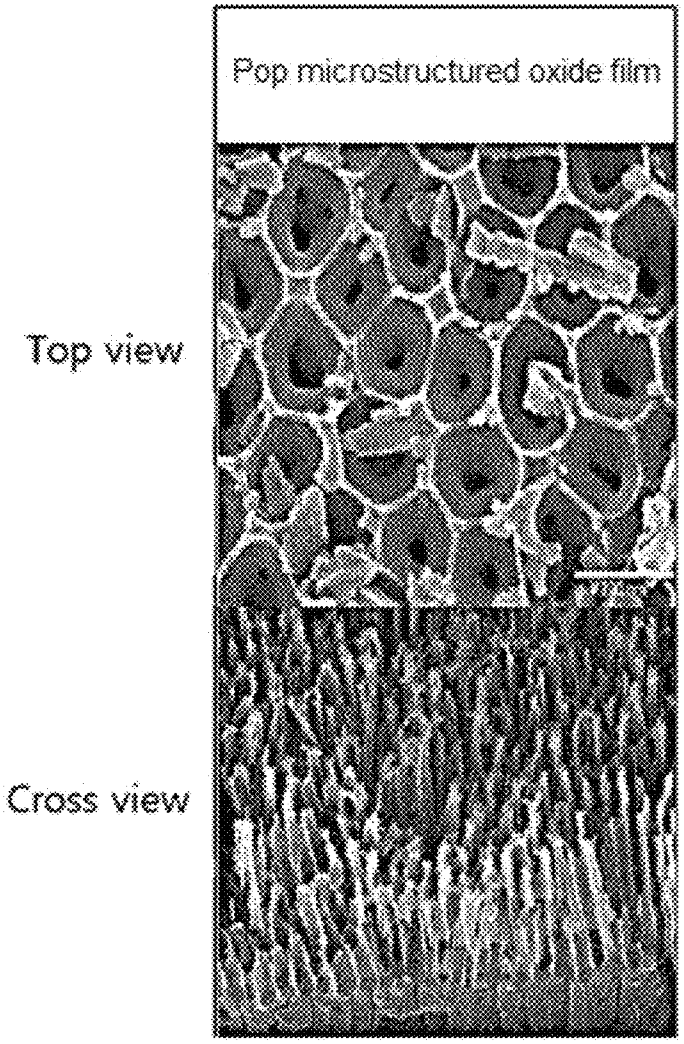

[Fig. 13]

Example 8A Measurement of water contact angle

| Time | 0 s | 30 s | 60 s |
|---|---|---|---|
| Contact angle (°) | 114.18 ± 1.56° | 112.94 ± 1.59° | 111.80 ± 1.73° |

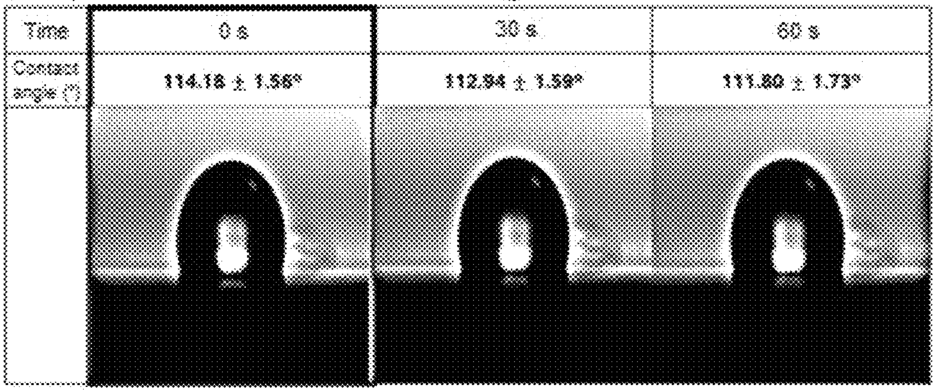

Example 8A Measurement of water contact angle hysteresis

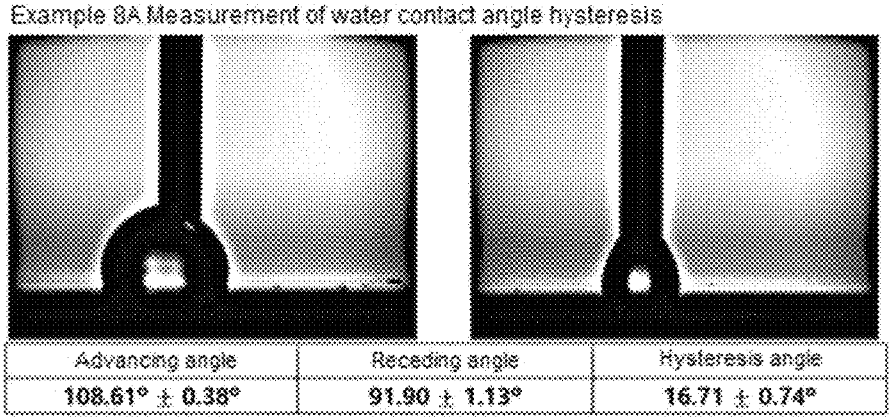

| Advancing angle | Receding angle | Hysteresis angle |
|---|---|---|
| 108.61° ± 0.38° | 91.90 ± 1.13° | 16.71 ± 0.74° |

Example 8A Measurement of oil contact angle

| Time | 0 s | 30 s | 60 s |
|---|---|---|---|
| Contact angle (°) | 73.35 ± 0.33° | 70.08 ± 0.38° | 68.98 ± 0.56° |

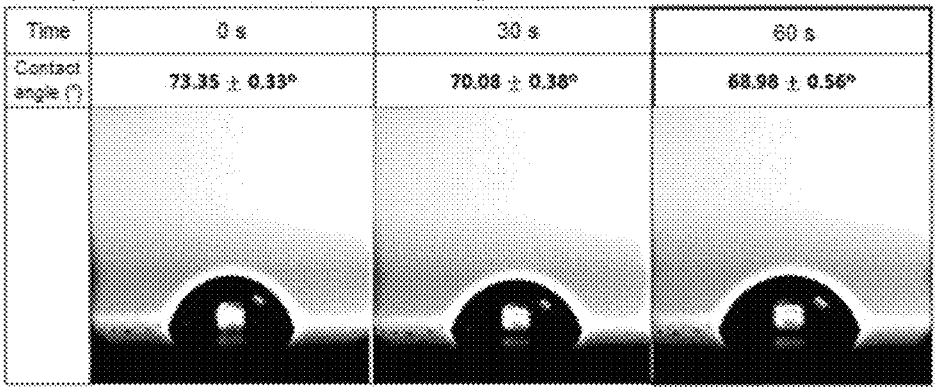

Example 8A Measurement of oil contact angle hysteresis

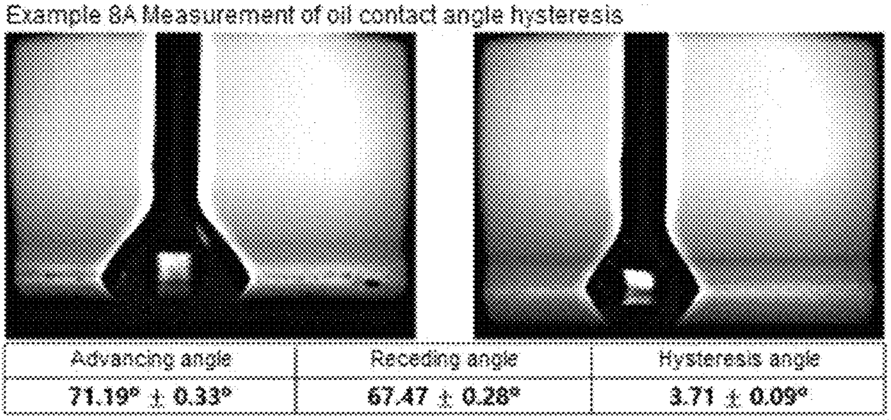

| Advancing angle | Receding angle | Hysteresis angle |
|---|---|---|
| 71.19° ± 0.33° | 67.47 ± 0.28° | 3.71 ± 0.09° |

[Fig. 14]

Example 9A Measurement of water contact angle

| Time | 0 s | 30 s | 60 s |
|---|---|---|---|
| Contact angle (°) | 116.22 ± 1.15° | 115.01 ± 1.21° | 113.71 ± 1.36° |

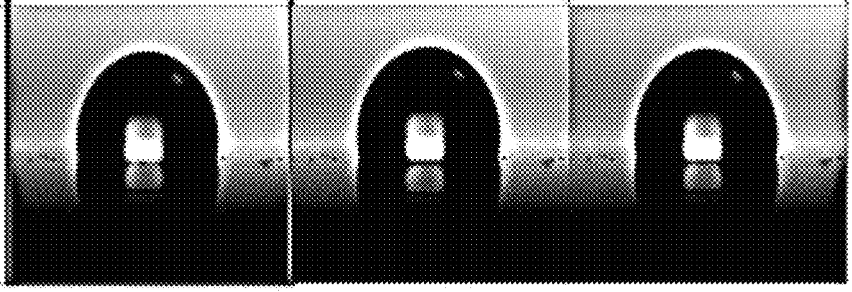

Example 9A Measurement of water contact angle hysteresis

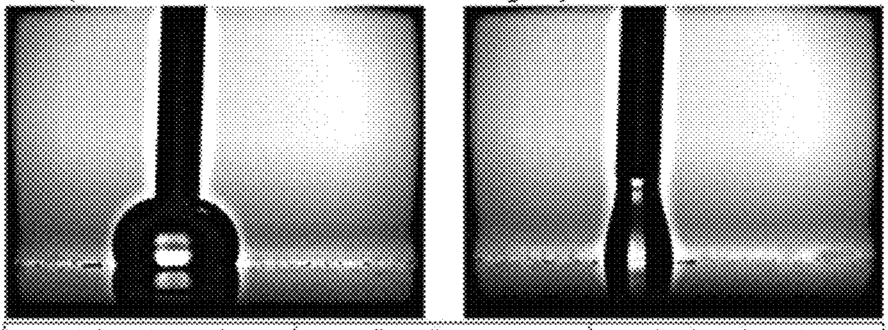

| Advancing angle | Receding angle | Hysteresis angle |
|---|---|---|
| 109.99° ± 0.65° | 94.57 ± 0.61° | 15.42 ± 0.04° |

Example 9A Measurement of oil contact angle

| Time | 0 s | 30 s | 60 s |
|---|---|---|---|
| Contact angle (°) | 73.32 ± 0.09° | 70.78 ± 0.13° | 69.44 ± 0.03° |

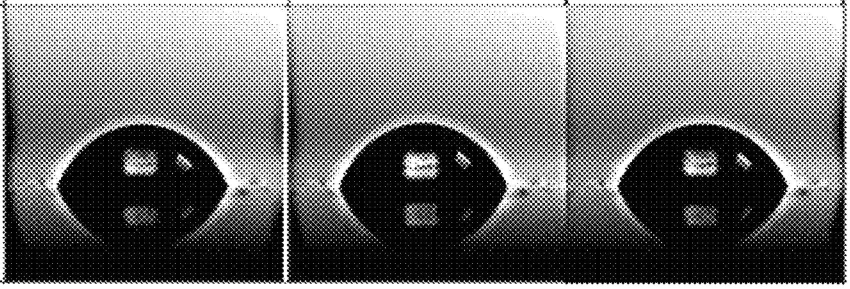

Example 9A Measurement of oil contact angle hysteresis

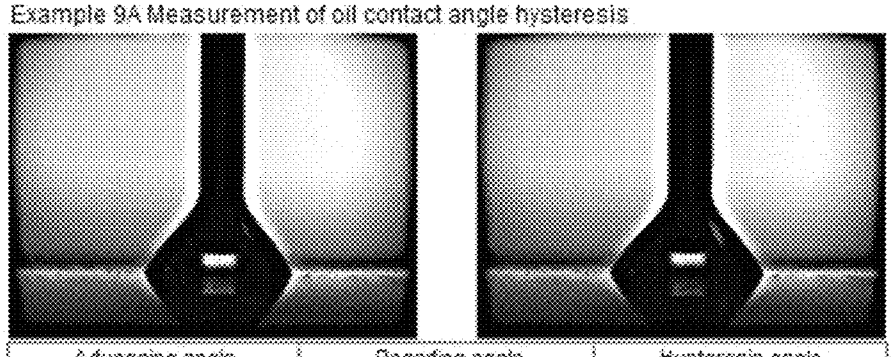

| Advancing angle | Receding angle | Hysteresis angle |
|---|---|---|
| 66.88 ± 0.12° | 64.21 ± 0.33° | 2.67 ± 0.41° |

[Fig. 15]

Example 10A Measurement of water contact angle

| Time | 0 s | 30 s | 60 s |
|---|---|---|---|
| Contact angle (°) | 170.51 ± 2.45° | 169.48 ± 0.55° | 166.20 ± 1.86° |

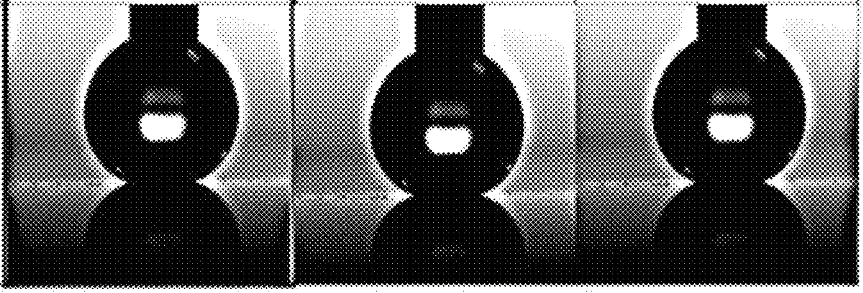

Example 10A Measurement of water contact angle hysteresis

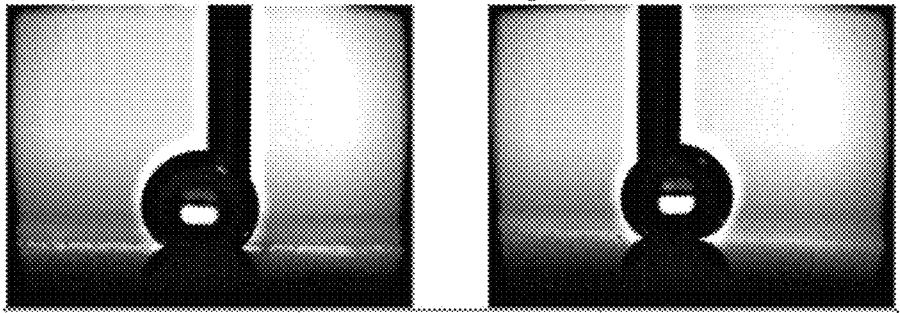

| Advancing angle | Receding angle | Hysteresis angle |
|---|---|---|
| 156.43° ± 1.21° | 152.61 ± 1.86° | 3.82 ± 0.67° |

Example 10A Measurement of oil contact angle

| Time | 0 s | 30 s | 60 s |
|---|---|---|---|
| Contact angle (°) | 82.33 ± 10.75° | 76.02 ± 7.48° | 74.20 ± 7.02° |

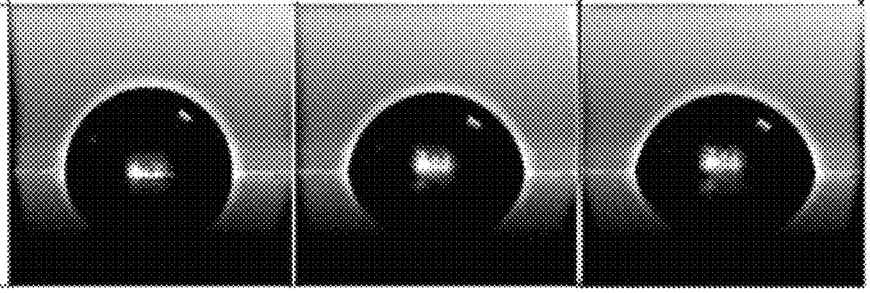

Example 10A Measurement of oil contact angle hysteresis

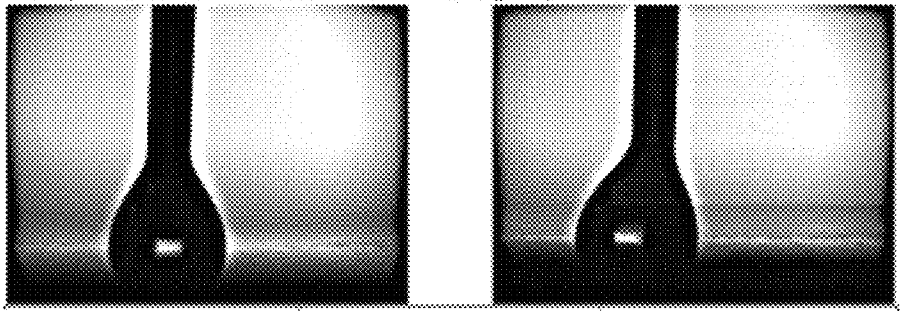

| Advancing angle | Receding angle | Hysteresis angle |
|---|---|---|
| 93.47 ± 0.67° | 92.39 ± 0.81° | 1.08 ± 0.16° |

[Fig. 16]
Example 8 (Hexane:curing agent=10:1) Coating film thickness
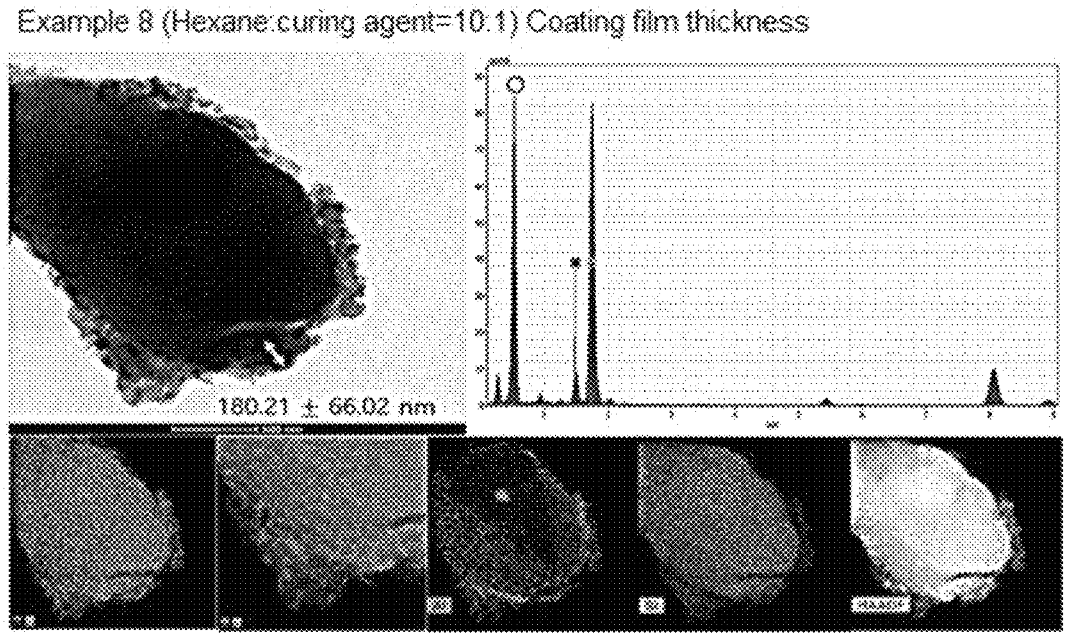
[Fig. 17]
Example 9 (Hexane:curing agent=10:0.5) Coating film thickness
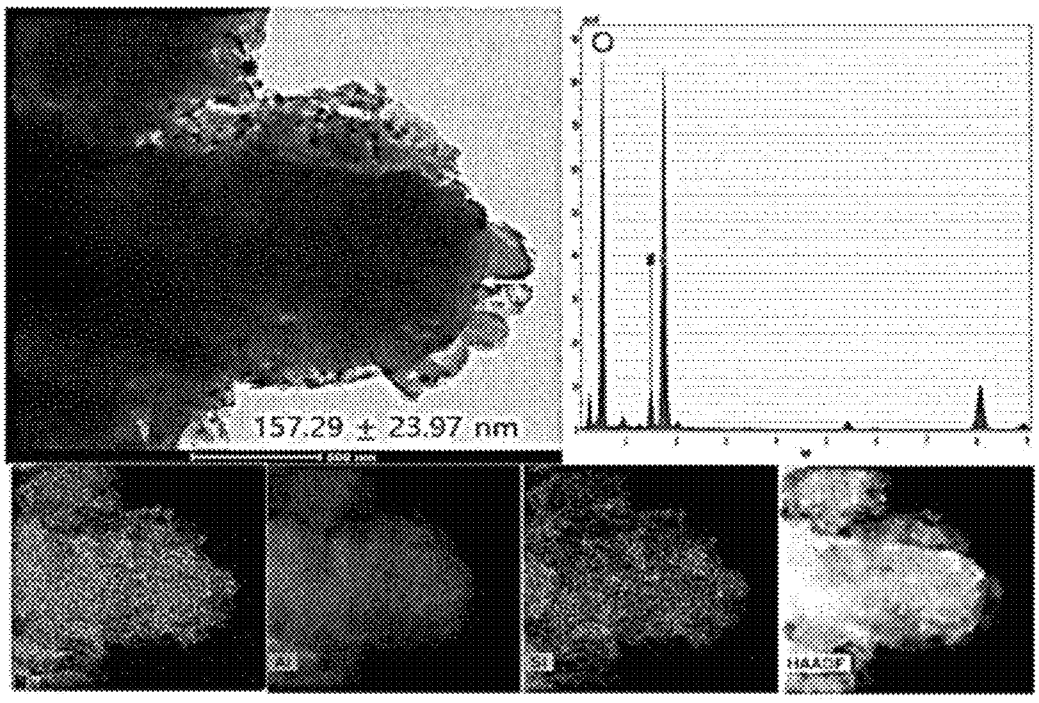

[Fig. 18]
Example 10 (Hexane:curing agent=10:0.1) Coating film thickness
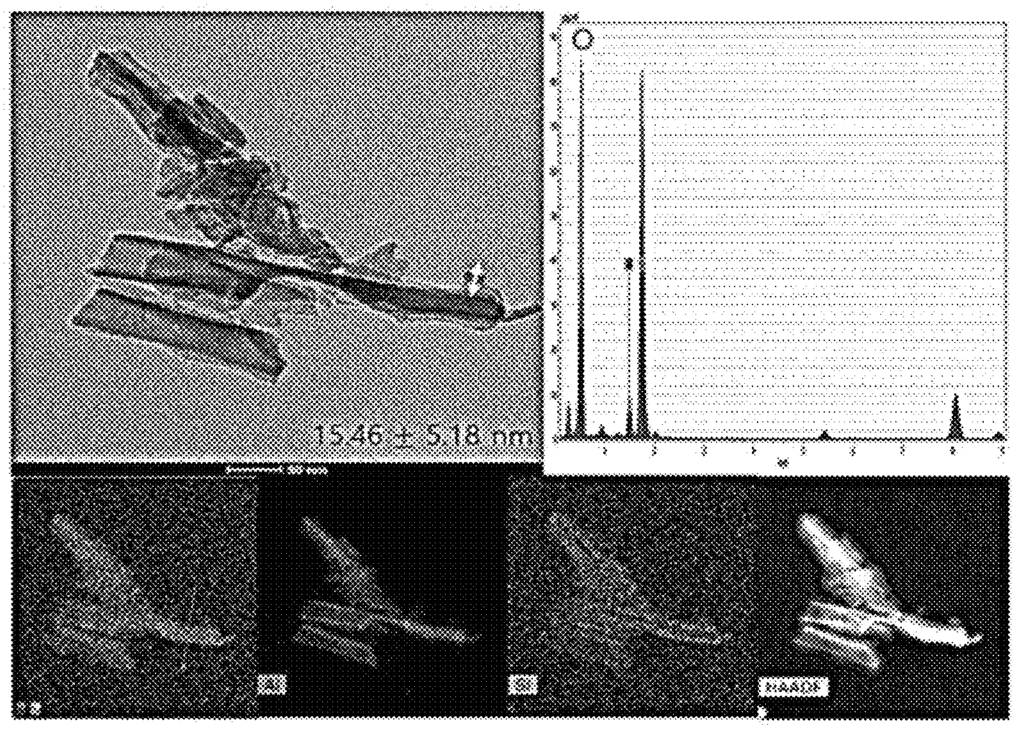

CROSSLINKING TYPE PDMS COMPOSITION MIXING PROCESS TECHNOLOGY FOR IMPROVING WATER-REPELLENT AND OIL-REPELLENT PROPERTIES

CROSS REFERENCE TO RELATED APPLICATIONS

This application is a National Stage of International Application No. PCT/KR2022/001425 filed Jan. 27, 2022, claiming priorities based on Korean Patent Application No. 10-2021-0012170 filed Jan. 28, 2021 and Korean Patent Application No. 10-2021-0085454 filed Jun. 30, 2021, the entire disclosures of which are incorporated herein by reference.

TECHNICAL FIELD

The present disclosure relates to a coating composition for imparting oil-repellent and water-repellent to the surface of a metal substrate containing a crosslinked PDMS derivative and hexane as an example of an organic solvent, which can be useful for oil vapor recovery apparatuses/facilities, pipes, hoods, parts of hoods, pipelines, nozzles, etc.

BACKGROUND ART

In general, water-repellent and oil-repellent mean properties that are difficult to get wet with water and oil, respectively, and super water-repellent/super oil-repellent is generally defined as a case in which the contact angle of water contacting the surface of a solid in the corresponding field is 150° or more and the contact angle of oil is 150° or more.

Recently, super water-repellent surfaces with contact angles to water of 150° or more have attracted considerable attention due to their importance in both of basic research and practical applications. Super water-repellent and super oil-repellent refer to physical properties in which the surface of an object is extremely difficult to get wet with water and oil, respectively. For example, leaves of plants, wings of insects, or wings of birds have characteristics that prevent any external contaminants from being removed without a special removal operation or from becoming contaminated from the beginning. This is because the leaves of plants, the wings of insects, the wings of birds, etc. have super water-repellent.

Wettability is key surface properties of solid materials, and it is primarily governed by both of the chemical composition and the geometrical micro/nanostructure. Wettable surfaces have attracted much attention due to their potential applications in various fields such as oil-water separation, anti-reflection, anti-bio adhesion, anti-adhesion, anti-fouling, self-cleaning, and fluid turbulence suppression.

Meanwhile, there have been some reports on the production of super water-repellent aluminum, but super water-repellent/super oil-repellent on a metal substrate has not received relatively much attention.

As air pollution due to recent environmental pollution has become serious and the occurrence of yellow dust or fine dust has increased, there are many cases in which a ventilation device is operated to purify indoor air rather than opening a window to perform ventilation. In addition, a ventilation device is also operated at all times in order to remove living dust, food odors, cigarette odors, various harmful odors generated during work, harmful air such as carbon monoxide, and fine dust, oil vapor, etc., generated from residential facilities, business facilities, and commercial facilities such as homes, workplaces, industrial sites, restaurants, offices, toilets, or bathrooms.

Such a ventilation device may be generally implemented by complicated facilities such as a ventilation system that is systematized and installed in a specific place and automatically operated according to the degree of indoor contamination, or may be implemented by a window-type ventilator that is installed on a wall adjacent to the outside and thus simply circulates air of the inside and outside.

However, since such a ventilator has a problem that dust inevitably accumulates inside and outside the ventilator when used for a certain period of time, there are problems in that it is unsanitary and a cumbersome task of separating and washing the ventilator to remove dust should be performed.

In particular, since there is no filtering device to primarily adsorb oil or fine dust in ventilators installed in restaurants or where oil vapor is generated, a case in which oil and fine dust are combined and flowed downward when the ventilators are used for a long period of time may occur, and this may not only give serious concerns about hygiene, but also can be exposed to the risk of fire.

RELATED ART DOCUMENT

Patent Document

Korea Patent Laid-Open Publication No. 10-2014-0101193

DISCLOSURE

Technical Problem

An object of the present disclosure is to provide a coating composition for imparting oil-repellent and water-repellent to the surface of a metal substrate.

Another object of the present disclosure is to provide a metal substrate coated with the coating composition.

Another object of the present disclosure is to provide a coating composition for imparting oil-repellent and water-repellent to a microstructured oxide film formed on the surface of a metal substrate through anodization treatment including the coating composition.

Another object of the present disclosure is to provide a metal substrate which is coated with the coating composition and on which a microstructured oxide film having oil-repellent and water-repellent imparted thereto is formed.

Technical Solution

In order to achieve the above purpose, the present disclosure provides a coating composition for imparting oil-repellent and water-repellent to the surface of a metal substrate, the coating composition including:

a crosslinked polydimethylsiloxane (PDMS) derivative represented by Chemical Formula 1; and one organic solvent of pentane, hexane, heptane, and octane.

[Chemical Formula 1]

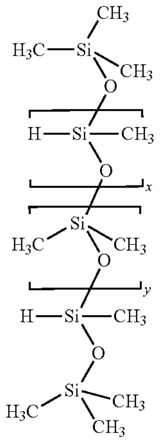

(In Chemical Formula 1, x and y are each an integer of 1 to 30, preferably an integer of 1 to 15, and more preferably an integer of 1 to 10.)

Advantageous Effects

Since the coating composition according to the present disclosure can impart water-repellent and oil-repellent by using the crosslinked PDMS derivative represented by Chemical Formula 1 and an organic solvent at a specific mixing ratio, its preparation cost is inexpensive, and the coating composition can adjust a coating film thickness to several to several tens of nm so that it can be applied also to the coating of the microstructured oxide film, the coating composition can be useful for oil vapor recovery apparatuses/facilities, pipes, hoods, parts of hoods, nozzles, pipelines, etc. that require water-repellent and oil-repellent.

DESCRIPTION OF DRAWINGS

FIGS. 1 to 10 are results of measuring contact angles and contact angle hysteresis by coating the coating solutions of Examples 1 to 10 on an aluminum 5052 alloy substrate that has not been subjected to anodization treatment and then dropping water and oil.

FIG. 11 is results of measuring contact angles and contact angle hysteresis by dropping water and oil on an aluminum 5052 alloy substrate (Comparative Example 1) on which coating has not been performed.

FIG. 12 is scanning electron microscope (SEM) images obtained by photographing a three-dimensional structure of a top view and a cross view of a POP-type microstructured oxide film obtained by performing the steps 1 to 4 in Comparative Example 2.

FIGS. 13 to 15 are results of measuring contact angles and contact angle hysteresis by coating the coating solutions of Examples 8 to 10 on an aluminum 5052 alloy substrate having a POP-type microstructured oxide film obtained by performing anodization treatment formed thereon, and then dropping water and oil.

FIGS. 16 to 18 are images of measuring the thicknesses of the coating films by photographing, with a transmission electron microscope (TEM), specimens obtained by scraping the surfaces of the samples with a tip after preparing samples by coating the coating solutions of Examples 8 to 10 on an aluminum 5052 alloy substrate having a POP-type microstructured oxide film obtained by performing anodization treatment formed thereon.

BEST MODE FOR CARRYING OUT THE INVENTION

The present disclosure provides a coating composition for imparting oil-repellent and water-repellent to the surface of a metal substrate, the coating composition including:

a crosslinked polydimethylsiloxane (PDMS) derivative represented by Chemical Formula 1; and one organic solvent of pentane, hexane, heptane, and octane.

[Chemical Formula 1]

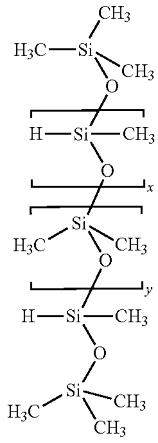

(In Chemical Formula 1, x and y are each an integer of 1 to 30, preferably an integer of 1 to 15, and more preferably an integer of 1 to 10.)

It may include 0.01 to 10 parts by weight, preferably 0.04 to 5 parts by weight, more preferably 0.04 to 3 parts by weight, more preferably 0.04 to 2 parts by weight, more preferably 0.04 to 1 part by weight, or particularly preferably 0.05 to 0.17 parts by weight of the crosslinked polydimethylsiloxane (PDMS) derivative represented by Chemical Formula 1 based on 10 parts by weight of the organic solvent.

If the content of the crosslinked PDMS derivative represented by Chemical Formula 1 above is out of the above-described range, there may be a problem in that oil-repellent and water-repellent decrease or the uniformity of coating is insufficient.

The coating composition according to the present disclosure does not include a polydimethylsiloxane (PDMS) derivative represented by Chemical Formula 2 below.

[Chemical Formula 2]

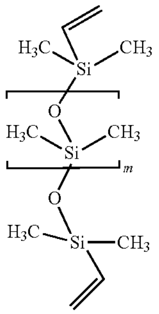

(In Chemical Formula 2, m is an integer of 1 to 100, preferably an integer of 1 to 80, and more preferably an integer of 1 to 60.)

The composition may be used by methods such as drop coating, dip coating, and spin coating, but is not limited thereto.

Hexane has been used as an example in the present disclosure among the organic solvents, but pentane, heptane, and octane may also be used.

Metals such as aluminum, aluminum alloys, titanium, titanium alloys, magnesium, magnesium alloys, stainless steel, steel, noble metals, rare metals, amorphous metals, alkali metals, alkaline earth metals, heavy metals, alloys, superalloys, and the like may be used as the metal substrate.

Further, the present disclosure provides a metal substrate coated with the coating composition for imparting oil-repellent and water-repellent.

The coating composition according to the present disclosure may be used in coatings for imparting water-repellent and oil-repellent to oil vapor recovery apparatuses, oil vapor recovery facilities, pipes, hoods, parts of hoods, pipelines, nozzles, etc.

MODE FOR CARRYING OUT THE INVENTION

Hereinafter, the present disclosure will be described in more detail by the following Examples. However, the following Examples are only to illustrate the present disclosure, and the content of the present disclosure is not limited by the following Examples.

<Examples> Manufacturing of Metals Imparting Water-Repellent and Oil-Repellent

As an example of a metal substrate, an aluminum 5052 alloy was used as a coating target substrate.

Step 1: Plasma Treatment

The substrate was plasma-treated for 15 minutes under conditions of 200 W, 50 kHz, $O_2$: 50 sccm. In Examples 1 to 6, the plasma treatment of the present step 1 was performed, and in Examples 7 to 10, the plasma treatment was not performed.

Step 2: Removal of Impurities Through Heat Treatment

The substrates that had been subjected to plasma treatment in the step 1 were heat-treated in an oven at 150° C. for 10 minutes to remove impurities. Meanwhile, the present step 2 was performed also on the samples of Examples 7 to 10 that had not been subjected to plasma treatment.

Step 3: Coating of Coating Agent

SYLGARD 184 Silicon Elastomer Curing Agent (Manufacturer: Dow chemical company), which is a crosslinked PDMS derivative represented by Chemical Formula 1, SYLGARD 184 Silicon Elastomer Base (Manufacturer: Dow chemical company), which is a PDMS derivative represented by Chemical Formula 2, and/or hexane as coating agents were dropped on the substrates from which the impurities had been removed in the step 2 in an amount of 60 μL per the substrate area of 2.5 cm×3 cm, and then coated by spin coating (corresponding to Examples 2, 4, and 6 to 7). Spin coating conditions were performed at 1,000 rpm for 30 seconds. In addition, drop coating was performed by another coating method (corresponding to Examples 1, 3, 5, and 8 to 10). In the case of drop coating, an appropriate amount of the coating agent was dropped, and then the substrates were tilted from side to side several times for coating.

In Examples 1 to 4, hexane, a main agent (Chemical Formula 2), and a curing agent (Chemical Formula 1) as coating agents were mixed and used, In Examples 5 to 10, hexane and a curing agent (Chemical Formula 1) as coating agents were mixed and used.

Step 4: Curing Through Heat Treatment

The substrates on which coating was completed in the step 3 were heat-treated in an oven at 300° C. for 30 minutes to complete curing.

TABLE 1

| | Whether | Coating agent composition (weight ratio) | | | | |
|---|---|---|---|---|---|---|
| | plasma treatment | | Coating agent (SYLGARD 184) | | | Amount of coating |
| Examples | has been performed or not | Hexane | Base (main agent) | Curing agent | Coating method | solution (μL/7.5 $cm^2$) |
| 1 | ○ | 10 | 1 | 0.1 | drop | 65 |
| 2 | ○ | 10 | 1 | 0.1 | spin | 65 |
| 3 | ○ | 10 | 2 | 0.2 | drop | 65 |
| 4 | ○ | 10 | 2 | 0.2 | spin | 65 |
| 5 | ○ | 10 | 0 | 1 | drop | 65 |
| 6 | ○ | 10 | 0 | 1 | spin | 65 |
| 7 | x | 10 | 0 | 1 | spin | 65 |
| 8 | x | 10 | 0 | 1 | drop | 85 |
| 9 | x | 10 | 0 | 0.5 | drop | 85 |
| 10 | x | 10 | 0 | 0.1 | drop | 85 |

[Chemical Formula 1: Curing Agent]

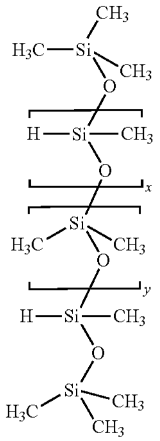

In Chemical Formula 1, x and y are each an integer of 1 to 30.

[Chemical Formula 2: Base]

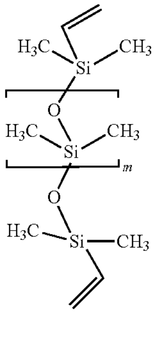

In Chemical Formula 2, m is an integer of 1 to 100.

<Comparative Example 1> Preparing Non-Anodization Treated Aluminum 5052 Alloy Substrate A sample on which the substrate used in Examples was not subjected to coating was prepared as Comparative Example 1.

<Comparative Example 2> Preparing SAM-Coated Substrate on Anodization-Treated Aluminum 5052 Alloy Substrate A sample obtained by performing self-assembled monolayer (SAM) coating on an aluminum 5052 alloy substrate on which a pillar-on-pore (POP) microstructure oxide film was formed through anodization treatment was prepared as Comparative Example 2.

Step 1: Pre-Patterning Process Through Primary Anodization and Chemical Etching

In order to remove impurities on the surface of an aluminum 5052 alloy (Alcoa INC, USA), it was cleaned by performing sonication in acetone and ethanol for 10 minutes. In order to obtain surface roughness, the ultrasonically cleaned aluminum 5052 alloy was put in a mixed solution of ethanol and perchloric acid (Junsei, $C_2H_5OH:HClO_4=4:1$ (v/v)), and electropolishing was performed for 1 minute by applying a voltage of 20 V was thereto at room temperature (20° C.). It was confirmed that the surface of the electropolishing-completed aluminum alloy became flat by being well reflected.

A primary anodization was performed by using the electropolished aluminum 5052 alloy (thickness: 1 mm, size: 25×30 mm) as a working electrode, using a platinum (Pt) electrode as a cathode, and constantly maintaining a distance between poles of the two electrodes at intervals of 5 cm. The primary anodization was performed using 0.3M oxalic acid as an electrolyte and constantly maintaining an electrolyte temperature at 0° C. using a double beaker. It was stirred at a constant speed in order to suppress interference with stable oxide growth due to local temperature rise, and a voltage of 40V was applied using a constant voltage method to grow an alumina layer by performing a primary anodization process for 6 hours.

A pre-patterning process of removing the grown alumina layer was performed by immersing for 10 hours the alumina layer grown through the primary anodization treatment in a solution having chromic acid (1.8 wt %) and phosphoric acid (6 wt %) mixed therein at 65° C. and thus performing etching.

Steps 2 to 4: Secondary and Tertiary Anodization and Pore Widening Process

Specifically, in order to obtain a desired film structure on the surface of the aluminum 5052 alloy, secondary anodization, pore widening, and tertiary anodization were sequentially performed after the pre-patterning was completed.

Specifically, the secondary and tertiary anodization processes were performed under the same acid electrolyte conditions as the primary anodization process of the step 1, and the secondary and tertiary anodization treatments were performed at an applied voltage of 80V and a treatment time of 0.5 minutes.

In addition, an aluminum 5052 alloy substrate on which a POP-type microstructured oxide film was formed was prepared by performing tertiary anodization after performing a pore widening (PW) process of immersing the alumina layer grown through secondary anodization in a 0.1M phosphoric acid solution at 30° C. for 60 minutes before performing tertiary anodization (see FIG. 12).

Step 5: Hydrophobic Film Formation Through SAM Coating

A film with hydrophobicity was formed by self-assembled monolayer (SAM) coating the aluminum 5052 alloy substrate on which the POP-type microstructured oxide film obtained in the step 4 was formed with 1H, 1H, 2H, 2H-perfluorodecyltrichlorosilane (FDTS), which is a coating material with low surface energy, in a vacuum chamber for 24 hours.

<Experimental Example 1> Evaluation of Coatability (Uniformity and Cracking)

In order to evaluate the coatability of the samples prepared in Examples 1 to 10, the uniformity of the coating and the cracking of the coating were evaluated.

TABLE 2

| | Coating uniformity (4 > 3 > 2 > 1 points in the uniform order) | Coating cracking (4 > 3 > 2 > 1 points in the order of no cracking occurrence) |
|---|---|---|
| Example 1 | 2 points | 1 point |
| Example 2 | 2 points | 1 point |
| Example 3 | 1 point | 1 point |
| Example 4 | 1 point | 1 point |
| Example 5 | 4 points | 4 points |
| Example 6 | 4 points | 4 points |
| Example 7 | 4 points | 4 points |
| Example 8 | 4 points | 4 points |
| Example 9 | 4 points | 4 points |
| Example 10 | 4 points | 4 points |

As shown in Table 2, it could be confirmed that the samples of Examples 5 to 10 are excellent in that the samples having no occurrence of cracking (4 points) while having excellent coating uniformity (4 points) have the most excellent coatabilities.

<Experimental Example 2> Evaluation of Water-Repellent and Oil-Repellent (1) Non-Anodization Treated Substrates With respect to the samples coated with the coating solutions of Examples 1 to 10 based on the aluminum 5052 alloy that had not been subjected to anodization treatment, water (purified water) and oil (edible oil) were dropped to evaluate the contact angle and contact angle hysteresis, respectively. The evaluation results are shown in FIGS. 1 to 11, and the results of FIGS. 1 to 11 are summarized and shown in Table 3 below. Comparative Example 1 is a sample in which the aluminum 5052 alloy was not treated with a coating solution.

Here, the 'contact angle hysteresis' refers to placing a sample on a stage of a device whose inclination can be finely adjusted, dropping water or oil on the sample, and then slowly adding the inclination to the stage, and allowing the angle of inclination at which water or oil begins to flow down to be measured. That is, the lower the contact angle hysteresis is, the more excellent the water-repellent/oil-repellent may be. For example, when the contact angle hysteresis is 1°, water or oil flows down even when the sample is tilted by only 1°, and when the contact angle hysteresis is 90°, water or oil does not flow down even when the sample is stood at 900.

Table 3 below is results of evaluating water-repellent and oil-repellent after coating a coating solution according to an embodiment on substrates on which a microstructured oxide film is not formed on the surface as non-anodization treated samples of an aluminum 5052 alloy substrate.

TABLE 3

| Non-anodization treated substrates | Water: Contact angle (0 second) | Water: Contact angle hysteresis | Oil: Contact angle (60 seconds) | Oil: Contact angle hysteresis |
|---|---|---|---|---|
| Example 1 | 107.59 ± 1.31° | 29.11 ± 0.44° | 60.56 ± 0.43° | 25.74 ± 0.41° |
| Example 2 | 104.57 ± 0.35° | 25.65 ± 0.58° | 61.05 ± 0.67° | 26.95 ± 0.64° |
| Example 3 | 99.57 ± 0.22° | 27.43 ± 0.75° | 57.05 ± 1.05° | 27.56 ± 0.37° |
| Example 4 | 100.28 ± 1.24° | 27.91 ± 0.94° | 54.87 ± 1.44° | 27.79 ± 0.09° |
| Example 5 | 102.66 ± 0.80° | 22.20 ± 0.58° | 60.79 ± 1.38° | 22.12 ± 0.37° |
| Example 6 | 100.87 ± 3.00° | 28.32 ± 0.85° | 58.44 ± 6.00° | 28.52 ± 2.90° |
| Example 7 | 103.96 ± 2.83° | 24.19 ± 0.24° | 59.62 ± 1.43° | 24.86 ± 1.40° |
| Example 8 | 114.13 ± 2.53° | 20.07 ± 0.41° | 58.84 ± 3.10° | 20.60 ± 0.20° |
| Example 9 | 113.22 ± 1.47° | 19.94 ± 2.20° | 54.55 ± 8.12° | 13.75 ± 1.02° |
| Example 10 | 114.63 ± 0.18° | 13.66 ± 0.42° | 55.01 ± 2.48° | 10.65 ± 0.92° |
| Comparative Example 1 (Non-coating treatment) | 77.72 ± 4.64° | 41.26 ± 4.31° | 31.67 ± 6.02° | 33.57 ± 0.68° |

As shown in Table 3, since the contact angle hysteresis of Examples 8 to 10 were shown to be the lowest, it could be confirmed that the water-repellent/oil-repellent was excellent. Meanwhile, no significant improvement in water-repellent/oil-repellent depending on whether plasma treatment has been performed or not was observed.

(2) Substrates on which a Microstructured Oxide Film is Formed Through Anodization Treatment Contact angles and contact angle hysteresis were evaluated by dropping water (purified water) and oil (edible oil), respectively, on the samples coated with the coating solutions of Examples 8 to 10 using, as a substrate, the aluminum 5052 alloy having an oxide film in the form of a POP microstructure formed thereon by performing anodization treatment, obtained by performing the steps 1 to 4 in Comparative Example 2, the evaluation results are shown in FIGS. 13 to 15, and the results of FIGS. 13 to 15 are summarized and shown in Table 4 below.

Table 4 below is results of evaluating water-repellent and oil-repellent after coating the coating solutions according to Examples 8 to 10 on the substrate having a pillar on pore (POP)-type microstructure oxide film, as an anodization-treated sample of an aluminum 5052 alloy substrate, formed on the surface thereof. Here, when a metal substrate is anodization-treated to form a POP-type microstructure on the surface, a superhydrophilic oxide film is formed, and this is an effect attributable to the oxygen atoms and microstructure included in the oxide film, and superhydrophobicity may be realized when the microstructure is maintained by applying a hydrophobic coating to the microstructure oxide film with a thin thickness of a monomolecular film level.

TABLE 4

| Anodization-treated substrates | Water: Contact angle (0 second) | Water: Contact angle hysteresis | Oil: Contact angle (60 seconds) | Oil: Contact angle hysteresis |
|---|---|---|---|---|
| Example 8A | 114.18 ± 1.56° | 16.71 ± 0.74° | 68.98 ± 0.56° | 3.72 ± 0.09° |
| Example 9A | 116.22 ± 1.15° | 15.42 ± 0.04° | 69.44 ± 0.03° | 2.67 ± 0.41° |
| Example 10A | 170.51 ± 2.45° | 3.82 ± 0.67° | 74.20 ± 7.02° | 1.08 ± 0.16° |
| Comparative Example 2 (FDTS coating) | 170.40 ± 0.05° | 3.91 ± 0.08° | 45.56 ± 2.36° | 69.54 ± 0.19° |

As shown in Table 4, all of Examples 8A to 10A showed excellent water-repellent and oil-repellent. In particular, water-repellent and oil-repellent were shown to be remarkably excellent in the case of Example 10A. Since the coating solution of Example 10 has a low content of the curing agent represented by Chemical Formula 1, and thus the thickness of the coating film formed is shown to be several to several tens of nm similar to that of a monomolecular film, this is considered to be effective according to maintaining the oxide film in the form of a microstructure.

Here, in substrates on which a POP-type microstructured oxide film is formed through anodization treatment, the diameter of pores in the POP microstructure is approximately 200 nm (see FIG. 12), and the thickness of the coating film must be as thin as a level of several to several tens of nm so that it may be possible to maintain the form of the microstructure formed in an oxide film, and when the thickness of the coating film exceeds a level of hundreds of nm, the effect according to the microstructure is lost as the coating film is coated flatly in a state in which the form of the microstructure disappears.

From this point of view, Comparative Example 2 is a sample in which superhydrophobicity is formed by coating FDTS as a hydrophobic self-assembled monolayer (SAM) coating agent sold at high prices on the market on a POP-type microstructured oxide film, and exhibits very excellent water-repellent, but there is a problem in that an FDTS coating agent is too expensive and cannot be applied to a large-area metal substrate. In addition, in the case of the FDTS coating agent, oil-repellent is hardly shown.

However, since the coating solution according to the present disclosure not only uses the curing agent represented by Chemical Formula 1, which is remarkably cheaper than the SAM coating agent, but also contains only 0.1 part by weight of the curing agent represented by Chemical Formula 1 based on 10 parts by weight of a hexane solvent based on Example 10, the coating solution may be prepared very cheaply, and it may not only produce a similar level of water-repellent as the SAM coating agent, but also may produce a remarkable effect in oil-repellent.

In Experimental Example 3 below, the thicknesses of the coating films formed when the substrate was coated using the coating solutions of Examples 8 to 10 were evaluated.

<Experimental Example 3> Coating Film Thickness Evaluation

After preparing samples coated with the coating solutions according to Examples 8 to 10 on a substrate having a POP (pillar on pore)-type microstructured oxide film formed on the surface thereof as an anodization-treated sample of an aluminum 5052 alloy substrate, specimens obtained by scraping the sample surfaces with a tip were measured by TEM to measure the thicknesses of the formed coating films, and the results are shown in FIGS. 16 to 18.

FIGS. 16 to 18 are images of measuring thicknesses of the coating films by photographing specimens obtained by scraping the sample surfaces with a tip with a transmission electron microscope (TEM) after preparing samples by coating the coating solutions of Examples 8 to 10 on an aluminum 5052 alloy substrate on which a POP-type microstructured oxide film was formed obtained by performing anodization treatment.

As shown in FIGS. 16 to 18, the tendency that the lower the content of the curing agent represented by Chemical Formula 1, the thinner the coating thickness was shown. The thicknesses of the coating films of Examples 8 to 9 were shown to be approximately 150 to 180 nm, and in particular, the thickness of the coating film of Example 10 was shown to be approximately a 15 nm level so that it could be confirmed that a coating thickness similar to that of the SAM coating agent was formed.

<Experimental Example 4> Derivation of Optimum Mixing Ratio of Crosslinked PDMS Derivative of Chemical Formula 1 and Hexane Suitable for Coating on a Substrate Having a Microstructured Oxide Film Formed Thereon Through the results of Experimental Examples 1 to 3, it could be confirmed that the sample of Example 10 had excellent coatability, also had remarkably excellent water-repellent and oil-repellent, and formed a coating film in a thickness thin enough to maintain the microstructure.

Accordingly, in the present Experimental Example 4, a contact angle hysteresis experiment was conducted in the same manner as in Experimental Example 2 in order to derive an optimal mixing ratio of the crosslinked PDMS derivative of Chemical Formula 1 and hexane suitable for coating on a substrate having a microstructured oxide film formed thereon.

In Table 5 below, the curing agent and hexane of the coating agent were measured and expressed in weight ratio, the substrates used an aluminum 5052 alloy having a POP-type microstructured oxide film formed thereon obtained by performing the steps 1 to 4 of Comparative Example 2, and samples were prepared by performing drop coating without plasma treatment equally as in Example 10.

TABLE 5

| | Coating agent mixing weight ratio | | Contact angle hysteresis (°) | |
|---|---|---|---|---|
| Example | Hexane | Curing agent (Chemical Formula 1) | Water | Oil |
| 10-1 | 10 | 0.01 | 18.22 ± 0.59 | 4.62 ± 0.66 |
| 10-2 | 10 | 0.03 | 17.66 ± 0.88 | 4.25 ± 0.57 |
| 10-3 | 10 | 0.05 | 4.03 ± 0.55 | 1.13 ± 0.23 |
| 10-4 | 10 | 0.07 | 3.98 ± 0.47 | 1.09 ± 0.28 |
| 10-5 | 10 | 0.1 | 3.82 ± 0.67 | 1.08 ± 0.16 |
| 10-6 | 10 | 0.13 | 3.91 ± 0.54 | 1.11 ± 0.22 |
| 10-7 | 10 | 0.15 | 3.89 ± 0.12 | 1.10 ± 0.41 |
| 10-8 | 10 | 0.17 | 3.95 ± 0.26 | 1.12 ± 0.58 |
| 10-9 | 10 | 0.20 | 14.87 ± 0.59 | 2.53 ± 0.87 |

As shown in Table 5, it could be confirmed in Examples 10-3 to 10-8 that the coating film thickness was formed thin enough to maintain the microstructure, and the coating film was formed uniformly over the entire substrate to show remarkably excellent water-repellent and oil-repellent. Meanwhile, in the case of Examples 10-1 and 10-2, the content of the curing agent is too low so that it is expected that the coating film is not formed on a portion of the substrate, and in the case of Example 10-9, the content of the curing agent is too high so that it is expected that a coating film is formed too thick to maintain the microstructure.

So far, the present disclosure has been looked at with respect to its preferred embodiments. Those skilled in the art to which the present disclosure pertains will be able to understand that the present disclosure can be implemented in a modified form without departing from the essential characteristics of the present disclosure. Therefore, the disclosed embodiments should be considered from an explanatory rather than a limiting point of view. The scope of the present disclosure is shown in particular in the claims rather than the foregoing description, and all differences within the equivalent range will be construed as being included in the present disclosure.

INDUSTRIAL APPLICABILITY

Since the coating composition according to the present disclosure can impart water-repellent and oil-repellent by using the crosslinked PDMS derivative represented by Chemical Formula 1 and an organic solvent at a specific mixing ratio, its preparation cost is inexpensive, and the coating composition can adjust a coating film thickness to several to several tens of nm so that it can be applied also to the coating of the microstructured oxide film, the coating composition can be useful for oil vapor recovery apparatuses/facilities, pipes, hoods, parts of hoods, nozzles, pipelines, etc. that require water-repellent and oil-repellent.

The invention claimed is:

1. A coating composition for imparting oil-repellent and water-repellent to the surface of a metal substrate, the coating composition comprising:

a crosslinked polydimethylsiloxane (PDMS) derivative represented by Chemical Formula 1; and an organic solvent selected from the group consisting of pentane, hexane, heptane, and octane:

[Chemical Formula 1]

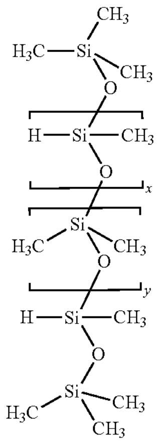

wherein, in Chemical Formula 1, x and y are each an integer of 1 to 30.

2. The coating composition of claim 1, wherein the coating composition comprises 0.01 to 10 parts by weight of the crosslinked polydimethylsiloxane (PDMS) derivative represented by Chemical Formula 1 above based on 10 parts by weight of the organic solvent.

3. The coating composition of claim 2, wherein the coating composition comprises 0.04 to 5 parts by weight of the crosslinked polydimethylsiloxane (PDMS) derivative represented by Chemical Formula 1 above based on 10 parts by weight of the organic solvent.

4. The coating composition of claim 3, wherein the coating composition comprises 0.04 to 2 parts by weight of the crosslinked polydimethylsiloxane (PDMS) derivative represented by Chemical Formula 1 above based on 10 parts by weight of the organic solvent.

5. The coating composition of claim 4, wherein the coating composition comprises 0.04 to 1 part by weight of the crosslinked polydimethylsiloxane (PDMS) derivative represented by Chemical Formula 1 above based on 10 parts by weight of the organic solvent.

6. The coating composition of claim 5, wherein the coating composition comprises 0.05 to 0.17 parts by weight of the crosslinked polydimethylsiloxane (PDMS) derivative represented by Chemical Formula 1 above based on 10 parts by weight of the organic solvent.

7. The coating composition of claim 1, wherein the coating composition does not comprise a polydimethylsiloxane (PDMS) derivative represented by Chemical Formula 2 below:

[Chemical Formula 2]

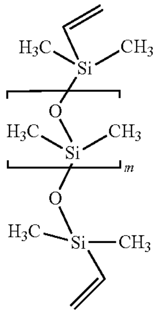

wherein, in Chemical Formula 2, m is an integer of 1 to 100.

8. The coating composition of claim 1, wherein the organic solvent is hexane.

9. The coating composition of claim 1, wherein the metal substrate is a metal selected from the group consisting of aluminum, aluminum alloys, titanium, titanium alloys, magnesium, magnesium alloys, stainless steel, steel, noble metals, rare metals, amorphous metals, alkali metals, alkaline earth metals, heavy metals, alloys, and superalloys.

10. A metal substrate having oil-repellent and water-repellent imparted thereto, coated with the coating composition of claim 1.

11. A coating composition for imparting oil-repellent and water-repellent to a microstructured oxide film formed on the surface of a metal substrate through anodization treatment comprising the coating composition of claim 1.

12. A metal substrate on which a microstructured oxide film that is coated with the coating composition of claim 11 and has oil-repellent and water-repellent imparted thereto is formed.

13. A coating composition for imparting oil-repellent and water-repellent to the surface of a metal substrate, the coating composition comprising:

a crosslinked polydimethylsiloxane (PDMS) derivative represented by Chemical Formula 1; and an organic solvent, wherein the coating composition does not comprise a polydimethylsiloxane (PDMS) derivative represented by Chemical Formula 2:

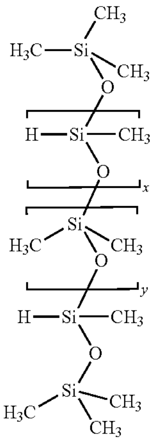

wherein, in Chemical Formula 1, x and y are each an integer of 1 to 30,

[Chemical Formula 2]

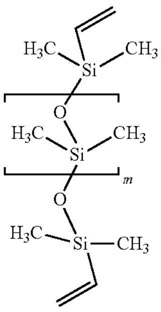

wherein, in Chemical Formula 2, m is an integer of 1 to 100.

* * * * *